(12) United States Patent
Muttineni et al.

(10) Patent No.: US 11,921,800 B2
(45) Date of Patent: *Mar. 5, 2024

(54) SYSTEM AND METHOD FOR SEGMENTING MOBILE ENTITIES BASED ON MOBILE DEVICE SIGNALS

(71) Applicant: xAd, Inc., New York, NY (US)

(72) Inventors: Prakash Muttineni, San Ramon, CA (US); Huitao Luo, Fremont, CA (US); Pravesh Katyal, Mountain View, CA (US); Al Rashid, Mountain View, CA (US); Akshay Tilak, Mountain View, CA (US); Shanshan Tuo, San Jose, CA (US)

(73) Assignee: xAd, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/176,429

(22) Filed: Feb. 28, 2023

(65) Prior Publication Data

US 2023/0297630 A1    Sep. 21, 2023

Related U.S. Application Data

(63) Continuation of application No. 17/182,212, filed on Feb. 22, 2021, now Pat. No. 11,593,442, which is a
(Continued)

(51) Int. Cl.
*G06F 16/951* (2019.01)
*G06F 16/23* (2019.01)
(Continued)

(52) U.S. Cl.
CPC ............ *G06F 16/951* (2019.01); *G06F 16/23* (2019.01); *G06F 16/25* (2019.01);
(Continued)

(58) Field of Classification Search
CPC ....... G06F 16/951; G06F 16/23; H04W 4/021
See application file for complete search history.

(56) References Cited

U.S. PATENT DOCUMENTS 9,445,229 B2 *  9/2016  Kurokawa ............ H04W 4/029
9,529,968 B2 * 12/2016  Adams .................... G16H 30/20
(Continued)

*Primary Examiner* — Huawen A Peng
(74) *Attorney, Agent, or Firm* — USCH Law, PC

(57) ABSTRACT

The present disclosure provides novel techniques to segment mobile entities based on signals from mobile devices associated with these mobile entities. In certain embodiments, a data file is built for each mobile entity to transform originally extremely high dimensional raw data derived from mobile devices communicating with a network into structured data characterizing associated mobile entities. The data files are structured for filtering and searching with respect to features associated with the signals from mobile devices, including location and non-location features. The data files are used to determine feature gains corresponding respectively to features related to a mobile segment. The features include first features of a first type and second features of a second type. The feature gains are used, among other things, to rank mobile entities for the mobile segment, with feature gains corresponding to the first features given a larger weight than feature gains corresponding to the second features.

20 Claims, 20 Drawing Sheets

Related U.S. Application Data continuation of application No. 15/909,894, filed on Mar. 1, 2018, now Pat. No. 10,929,483.

(60) Provisional application No. 62/465,812, filed on Mar. 1, 2017.

(51) Int. Cl.
*G06F 16/25* (2019.01)
*G06F 16/9538* (2019.01)
*H04W 4/021* (2018.01)
*G06N 7/01* (2023.01)

(52) U.S. Cl.
CPC ........ *G06F 16/9538* (2019.01); *H04W 4/021* (2013.01); *G06N 7/01* (2023.01)

(56) References Cited

U.S. PATENT DOCUMENTS

| | | | |
|---|---|---|---|
| 9,633,548 B2* | 4/2017 | Sager | G08B 13/19695 |
| 11,068,938 B2* | 7/2021 | Barrand | H04W 4/12 |
| 2011/0065421 A1* | 3/2011 | Gluck | G06Q 30/02 |
| | | | 455/414.1 |
| 2013/0023247 A1* | 1/2013 | Bolon | H04W 4/029 |
| | | | 455/414.1 |
| 2013/0054422 A1* | 2/2013 | DeSouza | G06Q 30/00 |
| | | | 705/27.1 |
| 2013/0115972 A1* | 5/2013 | Ziskind | H04W 4/21 |
| | | | 455/456.2 |
| 2014/0248912 A1* | 9/2014 | Snider | H04W 4/185 |
| | | | 455/456.3 |
| 2014/0280231 A1* | 9/2014 | Paruchuri | G06F 16/245 |
| | | | 707/749 |
| 2014/0308977 A1* | 10/2014 | Cheung | H04L 67/535 |
| | | | 455/456.3 |
| 2015/0072676 A1* | 3/2015 | Jordan | G01S 5/0027 |
| | | | 455/426.1 |
| 2015/0087263 A1* | 3/2015 | Branscomb | H04W 4/21 |
| | | | 455/410 |
| 2015/0237475 A1* | 8/2015 | Henson | H04W 4/021 |
| | | | 455/456.3 |
| 2016/0316329 A1* | 10/2016 | Frenz | H04W 24/08 |

* cited by examiner

| Name/Brand | Category | Place Identifier | Place Type | Spatial Index | Doc ID |
|---|---|---|---|---|---|
| Costco | General | US/CA/Almaden | BC | a1, a2, ..., ai | 132475 |
| Costco | General | US/CA/Almaden | BP | b1, b2, ..., bj | 135678 |
| Costco | General | US/CA/Almaden | BR | c1, c2, ..., ck | 136572 |
| T.J Maxx | Department | US/CA/Almaden | BC | d1, d2, ..., dl | 156321 |
| T.J Maxx | Department | US/CA/Almaden | BP | e1, e2, ..., em | 154376 |
| T.J Maxx | Department | US/CA/Almaden | BR | c1, c2, ..., ck | 157643 |
| Trader Joe's | Grocery | US/CA/Almaden | BC | f1, f2, ..., fn | 256321 |
| ...... | ...... | ...... | | | |

FIG. 2C

| Mobile Entity Data | | Past 1 Month | | | | Past 6 Month | | | | Past 1 Month | | | | Past 1 Month | | |
|---|---|---|---|---|---|---|---|---|---|---|---|---|---|---|---|---|
| | | Hour Slot | | All Day | | Hour Slot | | All Day | | Hour Slot | | 1 Hour Slot | | Hour Slot | | 4 |
| UID | ########### | Location History | | Location History | | Location History | | Location History | | Location History | | Location History | | App | | |
| Age | 35 | Feature | Freq | Feature | Freq | Feature | Freq | Feature | Freq | Feature | Freq | Feature | Freq | Feature | Freq | |
| Gender | M | BMW | 2 | BMW | 2 | BMW | 2 | BMW | 0 | BMW | 0 | weatherbug | 0 | | | |
| Device ID | ## #### #### # | Mercedes | 1 | Mercedes | 1 | Mercedes | 1 | Mercedes | 0 | Mercedes | 0 | memo | 0 | | | |
| Device Type | iPhone | Home Depot | 1 | Home Depot | 1 | Home Depot | 2 | Home Depot | 0 | Home Depot | 1 | mapquest | 11 | | | |
| Device OS | iOS 11.2.5 | Safeway | 3 | Safeway | 3 | Safeway | 20 | Safeway | 1 | Safeway | 1 | snapchat | 15 | | | |
| ...... | | SFO | 2 | SFO | 2 | SFO | 2 | SFO | 0 | SFO | 1 | news | 1 | | | |
| Segments | | Marriott | 4 | Marriott | 4 | Marriott | 10 | Marriott | 2 | Marriott | 1 | ###### | 6 | | | |
| Segment | Rank | ##### | # | ##### | # | ### | # | ### | # | ### | # | ### | # | | | |
| ### | ###### | ### | # | ### | # | ##### | # | ##### | # | ##### | # | ##### | # | | | |
| ##### ##### | ###### | ##### | # | ##### | # | ##### | # | ##### | # | ##### | # | ##### | # | Category | | |
| | | | | | | | | | | | | | | Feature | Freq | |
| # | ###### | ####### | # | ####### | # | ####### | # | ####### | # | ####### | # | ##### | # | ### | # | |
| ### ### | ###### | ### | # | ### | # | ### | # | ### | # | ### | # | ##### | # | ### | # | |
| ##### | ###### | ##### | # | ##### | # | ##### | # | ##### | # | ##### | # | ##### | # | ### | # | |
| ##### | ###### | ##### | # | ##### | # | ##### | # | ##### | # | ##### | # | ##### | # | ### | # | |
| | | ...... | | ...... | | ...... | | ...... | | ...... | | ...... | | ...... | | |
| | | imps/clicks/calls | | imps/clicks/calls | | imps/clicks/calls | | imps/clicks/calls | | imps/clicks/calls | | imps/clicks/calls | | | | |
| | | Imps | | Imps | 35 | Imps | 200 | Imps | | Imps | 2 | Imps | 11 | | | |
| | | Clicks | | Clicks | 1 | Clicks | 1 | Clicks | | Clicks | 0 | Clicks | 0 | | | |
| | | Calls | | Calls | 0 | Calls | 1 | Calls | | Calls | 0 | Calls | 0 | | | |

FIG. 5

| Segment | # of U with f in UHS | # of U with f in UH | UHS | UHP | Pr(f/UHS) | Pr(f|UHP) | FG | f-Type | f-Name |
|---|---|---|---|---|---|---|---|---|---|
| Lux_Cars | 240005 | 907518 | 1603536 | 105613882 | 14.96723491 | 0.632031498 | 23.6811535 | fpBrand | Chevrolet |
| Lux_Cars | 59149 | 493232 | 1603536 | 105613882 | 3.68866056 | 0.411009416 | 8.974637596 | fpBrand | Chrysler |
| Lux_Cars | 67811 | 528840 | 1603536 | 105613882 | 4.22884176 | 0.436523108 | 9.68755533 | fpBrand | Dodge |
| Lux_Cars | 7502 | 50812 | 1603536 | 105613882 | 0.467841071 | 0.041007867 | 11.40856885 | fpBrand | Fiat |
| Lux_Cars | 264416 | 937549 | 1603536 | 105613882 | 16.48955808 | 0.637352768 | 25.87194865 | fpBrand | Ford |
| Lux_Cars | 278328 | 342292 | 1603536 | 105613882 | 17.35714072 | 0.060564008 | 286.5916784 | fpBrand | GMC |
| Lux_Cars | 54985 | 436594 | 1603536 | 105613882 | 3.428984444 | 0.36132466 | 9.490037145 | fpBrand | Honda |
| Lux_Cars | 35160 | 259868 | 1603536 | 105613882 | 2.192654234 | 0.212763697 | 10.30558438 | fpBrand | Hyundai |
| Lux_Cars | 9221 | 48375 | 1603536 | 105613882 | 0.575041658 | 0.037072778 | 15.51115641 | fpBrand | Isuzu |
| Lux_Cars | 260 | 14385 | 1603536 | 105613882 | 0.016214167 | 0.013374189 | 1.212347673 | devType | laptop |
| Lux_Cars | 38689 | 184066 | 1603536 | 105613882 | 2.412730366 | 0.137649518 | 17.52806979 | fpBrand | Mazda |
| Lux_Cars | 17570 | 126441 | 1603536 | 105613882 | 1.095703495 | 0.103083987 | 10.62923089 | fpBrand | Mitsubishi |
| Lux_Cars | 47645 | 359395 | 1603536 | 105613882 | 2.971246046 | 0.295178999 | 10.06591273 | fpBrand | Nissan |
| Lux_Cars | 1328199 | 92324902 | 1603536 | 105613882 | 82.82938456 | 86.15979384 | 0.961346132 | devType | phone |
| Lux_Cars | 9728 | 56859 | 1603536 | 105613882 | 0.606659283 | 0.044625762 | 13.59437354 | fpBrand | Saab |
| Lux_Cars | 36876 | 274668 | 1603536 | 105613882 | 2.299667734 | 0.225152222 | 10.21383548 | fpBrand | Scion |
| Lux_Cars | 33943 | 233267 | 1603536 | 105613882 | 2.116759462 | 0.188728978 | 11.21586884 | fpBrand | Subaru |
| Lux_Cars | 266036 | 22254135 | 1603536 | 105613882 | 16.59058481 | 20.81932657 | 0.796883835 | devType | tablet |
| Lux_Cars | 79544 | 644083 | 1603536 | 105613882 | 4.960537213 | 0.534531057 | 9.280166505 | fpBrand | Toyota |
| Lux_Cars | 33911 | 190055 | 1603536 | 105613882 | 2.114763872 | 0.147844201 | 14.30400284 | fpBrand | Volkswagen |
| Lux_Cars | 19123 | 67406 | 1603536 | 105613882 | 1.19255196 | 0.045716528 | 26.08579459 | fpBrand | Volvo |

FIG.7D

| pepsitea12 | #UIDs in input and Segment | #UIDs in input - total | #UIDs in Segment | Ratio1 = tf = (100 * #UIDs in input and Segment / #UIDs in input - total) | Ratio2 = Within segment = (100 * #UIDs in input and Segment / #UIDs in Segment) | Query Weights - version 1 = Ratio1 Ratio2 | Query Weights version 2 = Ratio1 * Ratio2 | Normalized Query Weights - version 1 | Normalized Query Weights - Version 2 | Cumulative top Normalized Weights - Version 1 |
|---|---|---|---|---|---|---|---|---|---|---|
| p21+ | 17272384 | 123264003 | 145665266 | 14.0125126 | 0.11857586 | 14.0125126 | 1.66154572 | 21.072 | 2.499 | 21.072 |
| male | 7098752 | 123264003 | 57277357 | 5.75898221 | 0.12393644 | 5.75898221 | 0.71374778 | 8.660 | 1.073 | 29.732 |
| vda | 7572109 | 123264003 | 70895547 | 6.14300105 | 0.10680655 | 6.14300105 | 0.65611277 | 9.238 | 0.987 | 38.970 |
| millennials | 5798716 | 123264003 | 55452722 | 4.70430609 | 0.10457045 | 4.70430609 | 0.4919314 | 7.074 | 0.740 | 46.044 |
| s | 3788350 | 123264003 | 40499748 | 3.07336279 | 0.09354009 | 3.07336279 | 0.28748263 | 4.622 | 0.432 | 50.665 |
| smb | 2965712 | 123264003 | 27646813 | 2.40598385 | 0.10727139 | 2.40598385 | 0.25809323 | 3.618 | 0.388 | 54.284 |
| gz | 2903556 | 123264003 | 26760344 | 2.35555874 | 0.10850219 | 2.35555874 | 0.25558329 | 3.542 | 0.384 | 57.826 |
| female | 2389303 | 123264003 | 18370762 | 1.93836233 | 0.13006009 | 1.93836233 | 0.25210358 | 2.915 | 0.379 | 60.741 |
| agebracket_20 | 2628177 | 123264003 | 24445972 | 2.13215289 | 0.10750961 | 2.13215289 | 0.22922693 | 3.206 | 0.345 | 63.947 |
| agebracket_10 | 1570989 | 123264003 | 12872921 | 1.2744913 | 0.12203827 | 1.2744913 | 0.15553671 | 1.917 | 0.234 | 65.863 |
| gs | 1580637 | 123264003 | 14529895 | 1.28231841 | 0.10878516 | 1.28231841 | 0.13949722 | 1.928 | 0.210 | 67.792 |
| agebracket_30 | 961051 | 123264003 | 9441848 | 0.77966882 | 0.10178632 | 0.77966882 | 0.07935962 | 1.172 | 0.119 | 68.964 |
| b_Walmart Supercenter | 762498 | 123264003 | 6212502 | 0.61858935 | 0.12273606 | 0.61858935 | 0.07592322 | 0.930 | 0.114 | 69.894 |
| b_Subway | 719338 | 123264003 | 5547528 | 0.58357508 | 0.12966821 | 0.58357508 | 0.07567113 | 0.878 | 0.114 | 70.772 |
| b_McDonald's | 731186 | 123264003 | 5839972 | 0.59318697 | 0.12520368 | 0.59318697 | 0.07426919 | 0.892 | 0.112 | 71.664 |
| diy | 820247 | 123264003 | 7886487 | 0.6654392 | 0.10400664 | 0.6654392 | 0.06921009 | 1.001 | 0.104 | 72.665 |
| car | 782650 | 123264003 | 7241932 | 0.634938 | 0.10807199 | 0.634938 | 0.06861901 | 0.955 | 0.103 | 73.619 |
| ed | 816553 | 123264003 | 7994164 | 0.66244238 | 0.10214364 | 0.66244238 | 0.06766428 | 0.996 | 0.102 | 74.616 |
| hispanics | 813001 | 123264003 | 8112809 | 0.65956076 | 0.10021202 | 0.65956076 | 0.06609592 | 0.992 | 0.099 | 75.607 |

FIG. 9B

SYSTEM AND METHOD FOR SEGMENTING MOBILE ENTITIES BASED ON MOBILE DEVICE SIGNALS

CROSS REFERENCE TO RELATED APPLICATIONS

The present application is a continuation of U.S. patent application Ser. No. 17/182,212, filed Feb. 22, 2021, which is a continuation of U.S. patent application Ser. No. 15/909,894, filed Mar. 1, 2018, which claims priority to U.S. Provisional Application No. 62/465,812, filed Mar. 1, 2017, each of which is incorporated herein by reference in its entirety.

DESCRIPTION OF THE RELATED ART

The present application is related to information technology for mobile devices and more particularly to system and method for characterizing mobile entities based on signals from associated mobile devices for information delivery.

BACKGROUND

Smart phones and other forms of mobile devices are becoming more and more widely used. Nowadays, people use their mobile devices to stay connected with other people and to obtain information and services provided by mobile service providers and application developers. To keep the information and services free or low-cost, mobile service providers and application developers fund their activities at least partially by delivering sponsored information to the mobile devices that are engaging with them. The sponsored information is provided by sponsors who are interested in delivering relevant information to mobile users' mobile devices based on their locations. As a result, more and more mobile applications are designed to send location information of the mobile devices interacting with them (i.e., mobile supplies) to providers to enable location-based services (LBS).

To take advantage of the mobile nature of mobile phones, sophisticated computer technologies have been developed by information providers to estimate mobile device locations based on the signals they send so as to deliver precise, relevant, and timely information to the mobile devices based on their estimated locations. As a result, a large amount of location data of mobile entities (i.e., mobile devices and/or their users) can be collected.

Behavioral segmentation is used to group entities based on specific similarities. For example, creation of an audience segment makes it easier to serve certain information to people with specific interests demonstrated by their behaviors so that it is more likely to produce responses. Traditionally, behavioral segments of Internet users are formed based on their on-line behaviors, such as the links they click, the purchases they make, etc. The location data of mobile devices have very different characteristics than traditional Internet browsing histories. For example, unlike a click of an Internet link, which usually indicates a definite interest in the linked content, a detected location of a mobile device near a point of interest (POI) may or may not mean an interest of the user of the mobile device in the products or services provided at the POI. Thus, entirely different technologies are required to structure and search the big data generated by mobile information providers.

BRIEF DESCRIPTION OF THE DRAWINGS

FIG. 2C is a table illustrating examples of geo-fences stored in a geo-fence database according to certain embodiments.

FIG. 5 is a table illustrating structured data fields in an exemplary data file according to certain embodiments.

FIG. 7D is a table illustrating feature gain calculations to determine extended soft constraints according to certain embodiments.

FIG. 9B is a table illustrating query weight calculations used in the query generator according to certain embodiments.

DESCRIPTION OF THE EMBODIMENTS

Figure 1A:
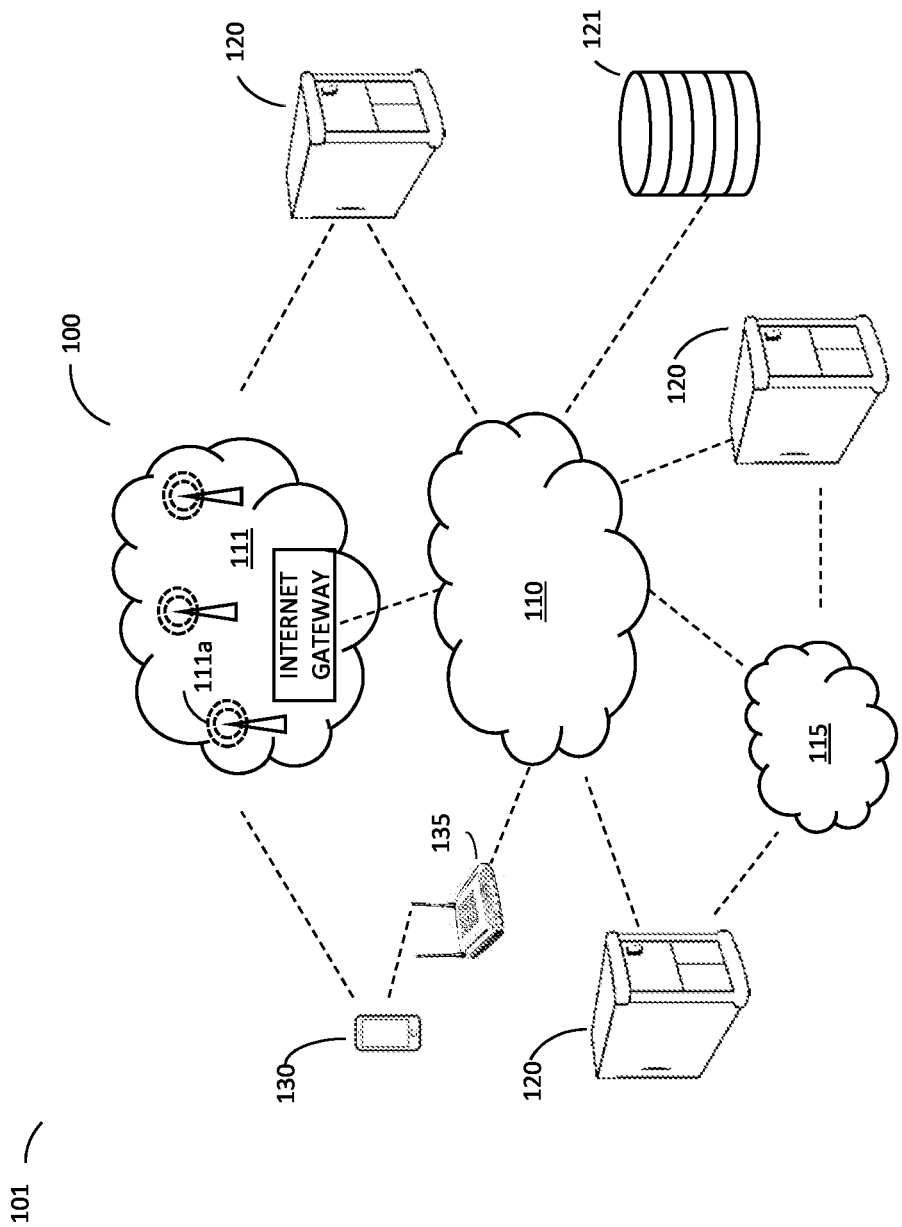
FIG. 1A is a schematic diagram illustrating an overview of an environment 101 in which some embodiments of the disclosed technology may operate.

The present disclosure provides novel techniques to derive characteristic of mobile entities based signals from mobile devices associated with these mobile entities. The derived characteristics are then used to characterize the mobile entities with respect to certain behavioral segments, which are indicative of intent or propensities to respond to certain information. In certain embodiments, pre-defined places associated with business/brand names are created, and information requests associated with mobile devices are processed to determine if the associated mobile devices have triggered any of these pre-defined places. If an incoming request is determined to have triggered one or more of the pre-defined places, it is annotated with the triggered place(s) and logged. The logged request data associated with a large number of mobile devices collected over a period (e.g., 1 month) are then used to characterize mobile entities with respect to certain audience segments.

In certain embodiments, a data file is built for each mobile entity. The data file includes data derived from the mobile device signals received from the mobile entity and structured for filtering and searching with respect to location and non-location features. A plurality of filters for a behavioral segment are applied to the data files of a large number of mobile entities. The plurality of filters including a preset hard constraint (HC) filter, a preset soft constraint (SC) filter, and an extended constraint (EC) filter built using location features in data files that have passed through the HC filter and/or the SC filter. The data files that have passed the HC filter and the SC filter, and the data files that have passed the HC filter and the EC filter, are tagged to indicate that the associated mobile entities are part of the segment. In certain embodiments, the HC filter includes a constraint about whether a data file needs to have a certain type of location history data in order to pass the HC filter, and the SC filter includes a set of location features, and one or more constraints about a minimum number of certain location features and/or a threshold overall feature frequency that a data file needs to satisfy in order to pass the SC filter. In certain embodiments, the EC filter is built by searching the HC filtered data files and the SC filtered data files for additional location features to add to the set of location features in the SC filter. In further embodiments, a search index and a search query for a search engine are generated for the behavioral segment based on the filtered data files, and the search query is run against the search index through the data files that have passed the HC filter to search for more data files to add to the segment.

In certain embodiments, the segment-tagged data files can be used to process incoming request so that the request can be annotated with one or more audience segments. The annotated requests with the one or more segments can be evaluated by the mobile information providers via their respective computer systems. This greatly reduces the computation time of the respective computer systems at the information providers and improves the accuracies of their outputs, resulting in greater return on investment for the information providers and reduced Internet traffic caused by signals carrying irrelevant information to mobile devices.

FIG. 1A is a schematic diagram illustrating an overview of an environment 101 in which some embodiments of the disclosed technology may operate. Environment 101 can include one or more computer systems 120 coupled to a packet-based network 100. The packet-based network 100 in certain embodiments includes the Internet 110 and part or all of a cellular network 111 coupled to the Internet 110 via an Internet Gateway. The computers/servers 120 can be coupled to the Internet 110 using wired Ethernet and optionally Power over Ethernet (PoE), WiFi, and/or cellular connections via the cellular network 111 including a plurality of cellular towers 111a. The network may also include one or more network attached storage (NAS) systems 121, which are computer data storage servers connected to a computer network to provide data access to a heterogeneous group of clients. As shown in FIG. 1D, one or more mobile devices 130 such as smart phones or tablet computers are also coupled to the packet-based network via cellular connections to the cellular network 111. When a WiFi hotspot (such as hotspot 135) is available, a mobile device 130 may connect to the Internet 110 via a WiFi hotspot 135 using its built-in WiFi connection. Thus, the mobile devices 130 may interact with other computers/servers coupled to the Internet 110. A mobile device 130, or its user, or anyone or anything associated with it, or any combination thereof, is sometimes referred to herein as a mobile entity.

The computers/servers 120 can include server computers, client computers, personal computers (PC), tablet PC, set-top boxes (STB), personal digital assistant devices (PDA), web appliances, network routers, switches or bridges, or any computing devices capable of executing instructions that specify actions to be taken by the computing devices. As shown in FIG. 1A, some of the computers/servers 120 are coupled to each other via a local area network (LAN) 115, which in turn is coupled to the Internet 110. Also, each computer/server 120 referred herein can include any collection of computing devices that individually or jointly execute instructions to serve as a system for characterizing mobile entities, as described in further detail below.

Figure 1B:
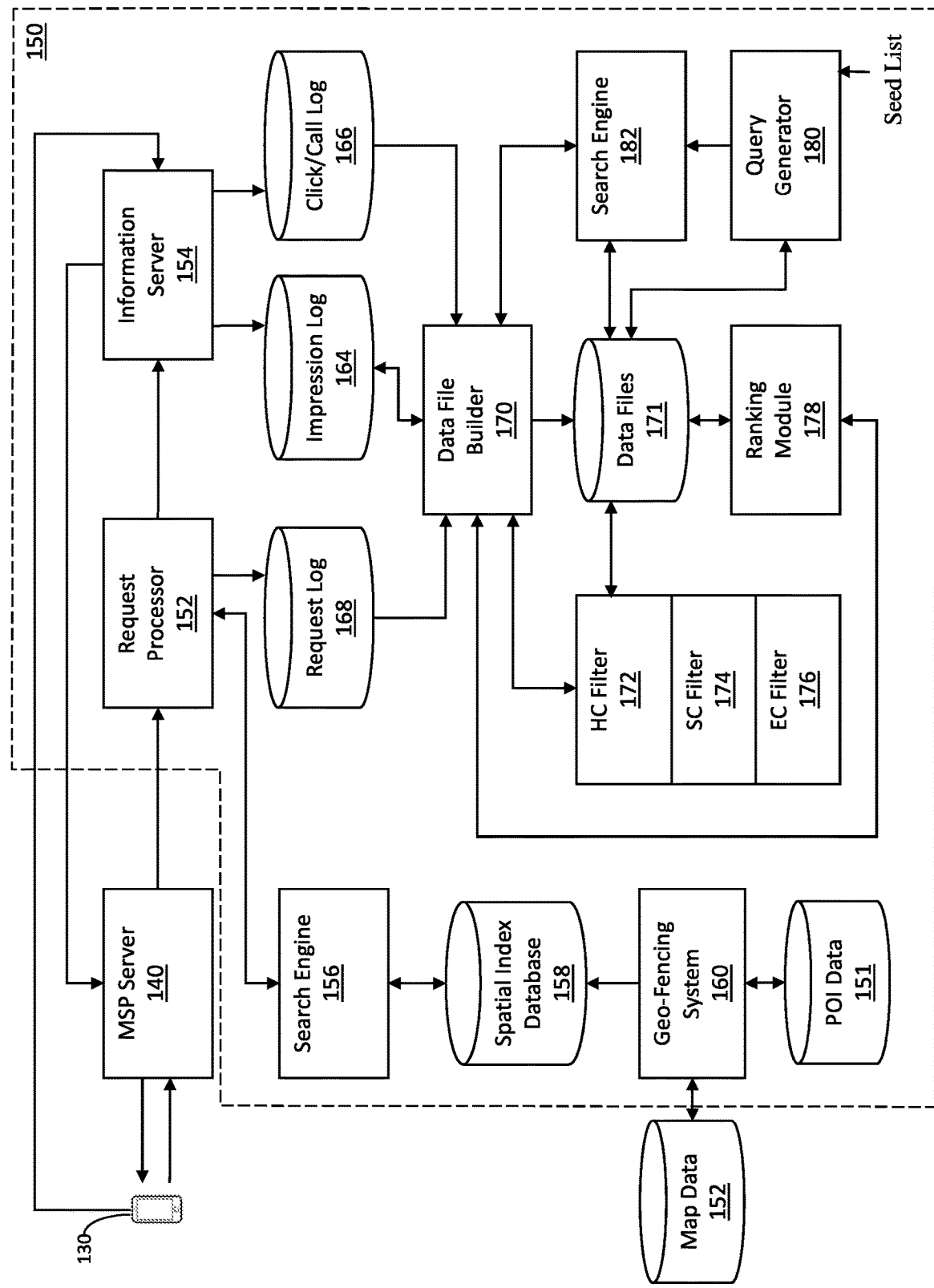
FIG. 1B is a block diagram of a system for characterizing mobile entities according to certain embodiments.

As shown in FIG. 1B, the computers/servers 120 coupled to the Internet may include mobile service provider (MSP) computers/servers 140 that interact with certain mobile devices 130 via software applications (apps) installed on the mobile devices 130. The MSP computers/servers 140 (referred to individually and collectively as the MSP server 140) are coupled via the network 100 to a system 150 for characterizing mobile entities based on the signals from the mobile devices 130 according to certain embodiments. The system 150 can be provided by one or more of the computers/servers 120. As the MSP server 140 interacts with the mobile devices 130, it generates requests for sponsored information and transmits the requests to the system 150. Each request is transmitted as one or more data packets and include request data such as: a request ID, an identifier that identifies the MSP (i.e., MSP ID), an identifier that identifies an associated mobile device (i.e., mobile device ID), an identifier that identifies a user or entity associated with the mobile device (i.e., user ID or UID), certain attributes about the user or mobile entity (e.g., age, gender, income level, education level, etc.), a time stamp, and location data (e.g., a latitude/longitude pair (lat/long, or LL), zip code (ZC), city-state (CS), IP address (IP), etc. Almost all of the request data, except the MSP ID and the time stamp, are derived by the MSP server 140 from the signals it receives from the associated mobile device. For example, the LL may be detected by the GPS function of the associated mobile device and packaged in the data packet it sends to the MSP server 140 if the mobile device is set up to allow its location be known by the MSP server 140. The IP address may be the IP address of a WiFi router or an IP address assigned to the mobile device by a cellular network tower, via which the mobile device is interacting with the Internet.

According to certain embodiments, as shown in FIG. 1B, the system for characterizing mobile entities includes a request processor 152 that receives and processes the requests from the MSP server 140, and an information server 154 that transmits selected information to the MSP server in response to the requests. The information can be provided in the form of, for example, an html/JavaScript file, or a link to a universal resource location (URL), which can be used by the MSP or a mobile device to fetch the html/JavaScript file. The html/JavaScript file, once displayed on a mobile device, also include one or more links that an interested user can click to access a webpage or place a call using the mobile device. In certain embodiments, the html/JavaScript file is designed such that when it is displayed or impressed on a mobile device, a signal is sent by the MSP server or the mobile device automatically so that the information server 154 can keep track of whether the file has really been impressed on the mobile device. The information server 154 records the impressions it detects in an impression log 164. In certain embodiments, the html/JavaScript file is designed such that when any of the one or more links are clicked, a signal is also sent from the mobile device to the information server 154 in the background so that the information server 154 can keep track of the clicks/calls made on the html/ JavaScript file. The information server records the clicks/ calls it detects in a click/call log 166.

In certain embodiments, the request processor 152 examines the location data in each request to determine whether they include a reliable LL pair, and if the request does not include a reliable LL pair, the request processor 152 would proceed to derive the location of the associated mobile device from other information in the location data, as described in more detail in commonly owned U.S. Pat. No. 9,886,703, issued on Feb. 6, 2018, which is incorporated herein by reference in its entirety. The detected mobile device location is input to a search engine 156, which searches in a spatial index database 158 for one or more POI places that includes the detected location and returns the search results to the request processor 152.

In certain embodiments, the system 150 further includes a geo-fencing system 160 that generates the spatial index defining geo-fences associated with the html/JavaScript files delivered by the information server 154. In certain embodiments, the geo-fencing system 160 defines virtual perimeters of defined areas that mirror real-world geographical areas for mobile advertising. A defined area according to certain embodiments can be a static circle around a business location, e.g. a fence obtained using offline index databases such as InfoUSA (www.infousa.com), which provides a list of POIs and their locations, or areas specified by marketers using predefined boundaries, such as neighborhood boundaries, school attendance zones, or parcel boundaries, etc.

In certain embodiments, the defined areas include places computed by the geo-fencing system 160 using meta-information and/or geographical information associated with the POIs. As shown in FIG. 3, the geo-fencing system 160 has access to a (POI) data 151 (e.g., InfoUSA), which provides a list of POIs and their corresponding brand names, addresses, and geographical locations. The geo-fencing system 160 also has access to publicly available map data 152 (e.g., Open Street Map), which provides information about the surroundings of the POIs in the POI directory. The geo-fencing system 160 generates definitions of one or more places in the form of, for examples, a set of geographic points defining the perimeters of one or more places for each POI.

Figure 2A:
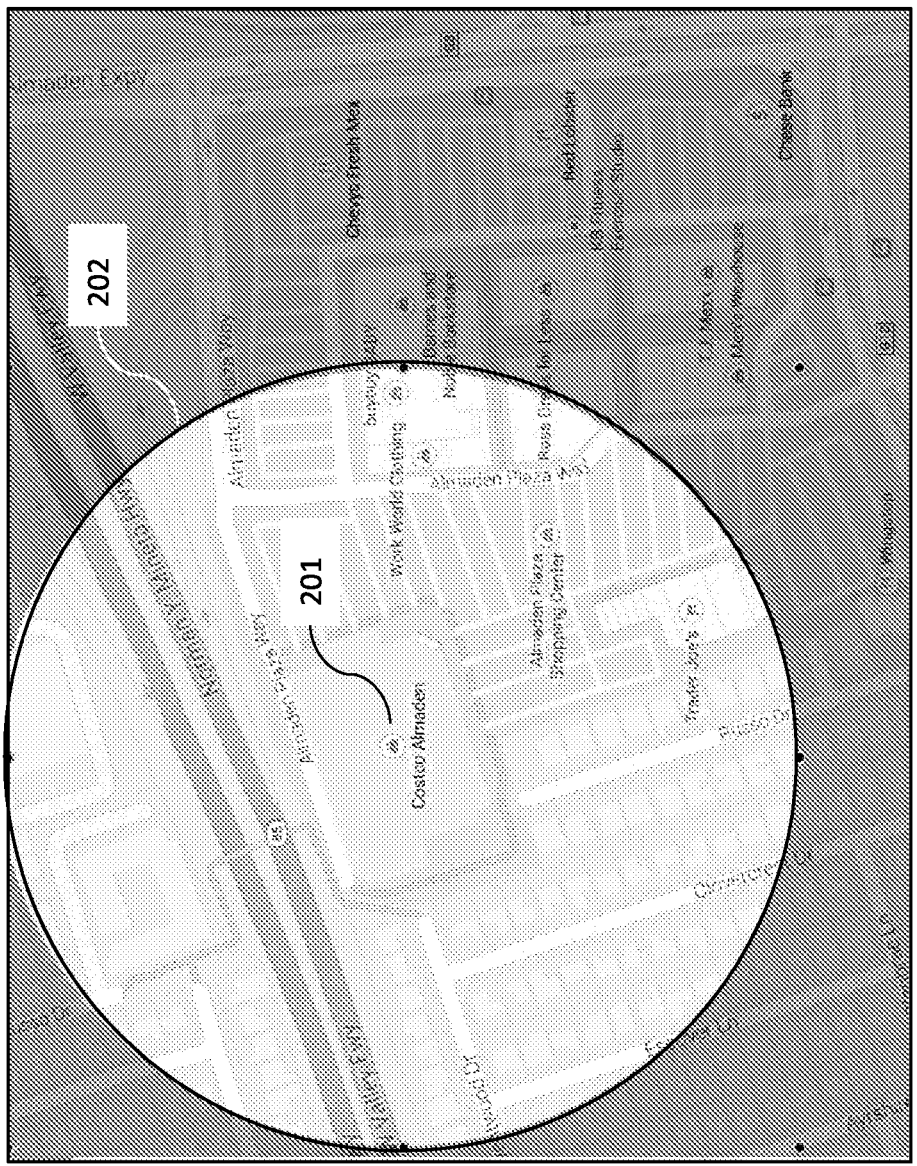
FIG. 2A is a diagrammatic representation a simple geo-fence in the shape of a circle.

In certain embodiments, the geo-fencing system 160 generates or defines one or more places for each of a plurality of POIs in consideration of the map data around the POI. For example, as shown in FIG. 2A, a simple geo-fence for the Costco Almaden store without consideration of the map data can be in the shape of a circle 202 around the store location 201, based on the assumption that a user's intent to visit a given POI could be derived from his or her distance from the POI. However, as shown in FIG. 2A, the circle fence encompasses a major highway, a residential area, and areas on the other side of the major highway. Information about the POI served to mobile devices in these areas would most likely be ignored because people living close to the POI, people traveling on the highway, and people on the other side of the highway are either already familiar with what the POI has to offer or are unlikely to bother to respond to information related to the POI.

Figure 2B:
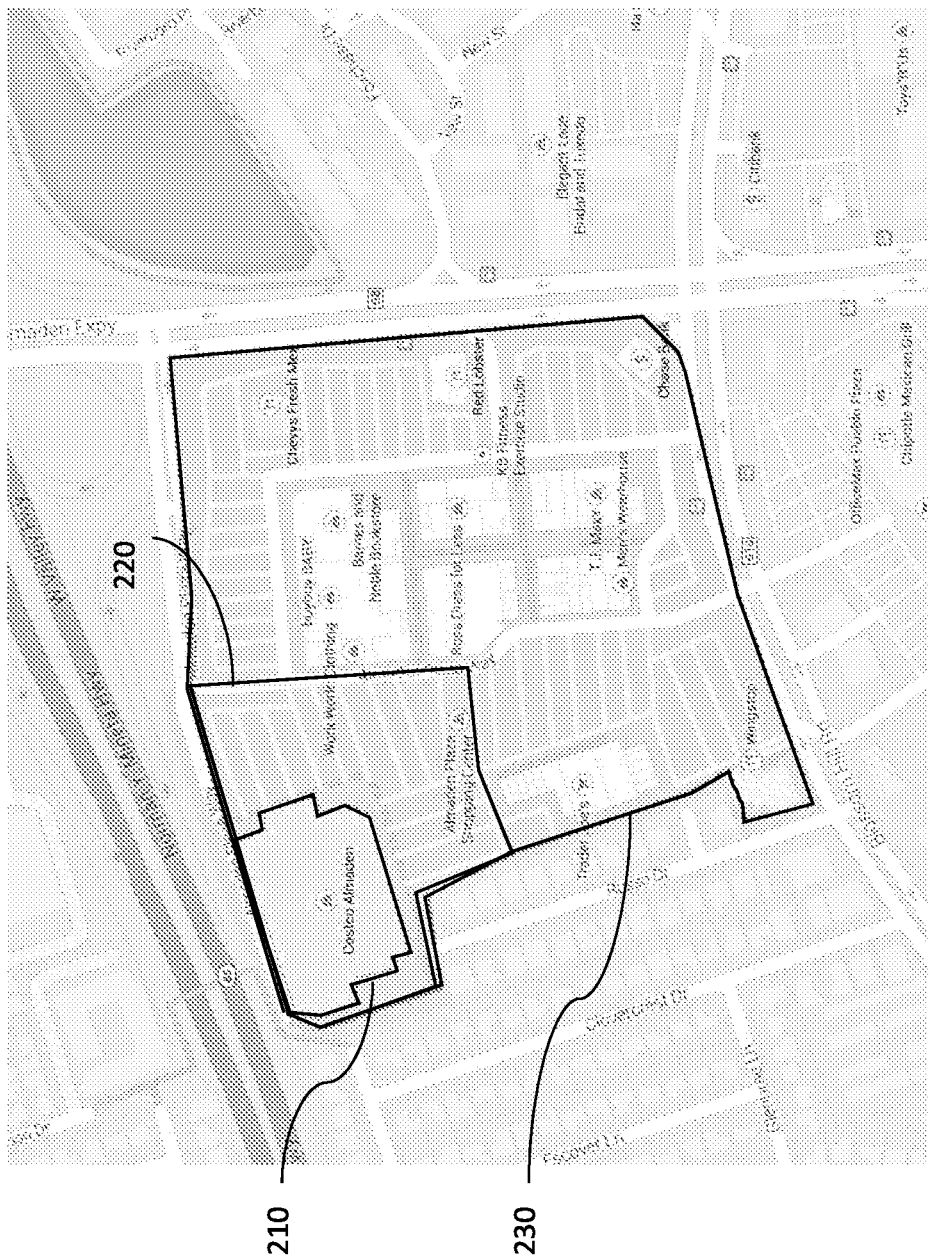
FIG. 2B is a diagrammatic representation of one or more polygon geo-fences defined in conformity with geographical configuration and surroundings of a store according to certain embodiments.

Therefore, instead of or in addition to geo-fences based on a radius around a centroid of a business location, the geo-fencing system 160 according to certain embodiments uses the map data 151 to define places that are of more interests to information sponsors. As shown in FIG. 2B, the geo-fencing system 160 defines one or more polygons in conformity with the geographical configuration and surroundings of the POI, such as a first polygon 210 around the building of the store, a second polygon 220 around the building and its parking lot, and/or a third polygon 430 around a shopping area or business region including the POI and other stores. More details of such a geo-fencing system can be found in co-pending U.S. patent application Ser. No. 14/716,811, filed on May 19, 2015, which is incorporated herein by reference in its entirety.

In certain embodiments, different types of places may be defined for a POI so that information servers can provide information for delivering to mobile devices based on the type of places triggered by detected locations. For example, a request associated with a mobile device located inside the first polygon 210 around the building of the POI may be more valuable to an information sponsor and thus may be of higher value than a request associated with a mobile device that is in the shopping area (polygon 230) but not inside the store. Or, conversely, polygon 230 may be of higher value to another information sponsor who would like to attract mobile users in the business region than polygon 210, which indicates that the mobile user is already in the store. In certain embodiments, these three types of places are defined by extracting building polygons, parking lot polygons and land-use polygons from local and national geographical information systems (GIS). In certain embodiments, some or all of the places can be defined manually with assistance of computer annotation tools and by consulting some external map and/or satellite data to make sure that the geo-fences are aligned with the real building and region boundary information surrounding the intended businesses.

In certain embodiments, the different types of places associated with a business that are offered to the information sponsors include, for example, (1) a business center (BC) represented by, for example, a polygon corresponding to the perimeter of the building of the business (e.g., the first polygon 210 in FIG. 2B); (2) a business premise (BP) represented by a polygon corresponding to the perimeter of the business building and the neighboring parking lots (e.g., the second polygon 220 in FIG. 2B); and (3) a business region (BR) or area represented by a polygon corresponding to the perimeter of a shopping center or business or commercial area in which this business is located (e.g., the third polygon 230 in FIG. 2B). If a business center is triggered by a mobile device location, it can be reliably inferred that the user of the mobile device is interested in the business by actually visiting it. Triggering of a business premise provides good indication of an intent to visit the business, but not as strong as triggering the business center. If a user triggers a business region, the intent may be regarded as valid but weaker than that from triggering a business premise.

The geo-fencing system further generates spatial indices representing the areas defined by the geo-fencing system 160, which are stored in the spatial index database 158 for searching by the search engine 156 with spatial queries, such as how far two points differ, or whether certain point falls within a spatial area of interest. FIG. 2C illustrates examples of spatial indices of geo-fences stored in the database 158, according to certain embodiments. As shown, the store Costco in Almaden has three different types of places associated with it—place US/CA/Almaden/BC is a business center (BC), which is a polygon around the store building and represented by spatial index a1, a2, . . . , ai; place US/CA/Almaden/BP is a polygon around the store's larger premise including its parking lot and represented by spatial index b1, b2, . . . , bj; and place US/CA/Almaden/BR is a polygon around the shopping center including the store and other stores and represented by spatial index c1, c2, . . . , ck. FIG. 2C also shows that the store T.J. Maxx has three types of places associated with it, and the store Trader Joe's has at least a business center place associated with it. As shown in FIG. 2C, each geo-fence entry in the database 158 includes the spatial indices associated with the respective place together with other information about the respective place, such as, for example, a name/brand associated with the place, a category of the place, a place identifier identifying a particular locale (e.g., city, district, etc.) for the place, the place type, and/or one or more doc IDs identifying one or more information documents (e.g., one or more html/JavaScript files) for the name/brand or the place.

In certain embodiment, the search engine 156 and some or all of the spatial index database 158, the geo-fencing system, and the POI database 151 can be part of the request processor 152.

Figure 3A:
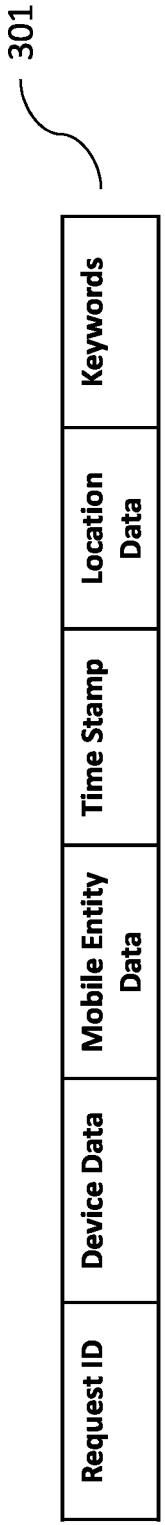
FIGS. 3A-3C are block diagrams illustrating some of the content of a request at different stages of processing by the request processing system according to certain embodiments.
Figure 3B:
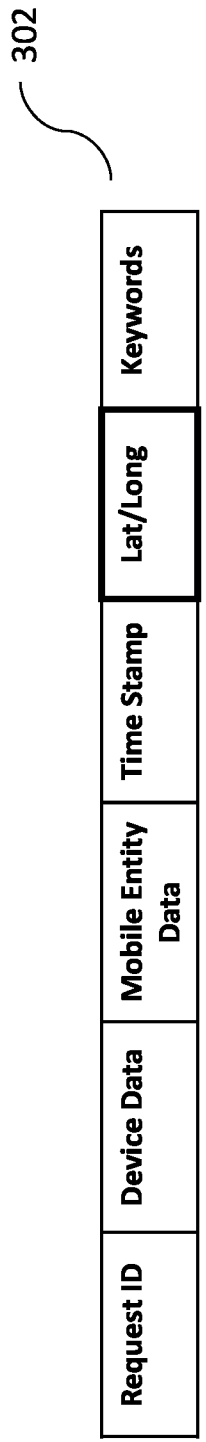
Figure 3C:
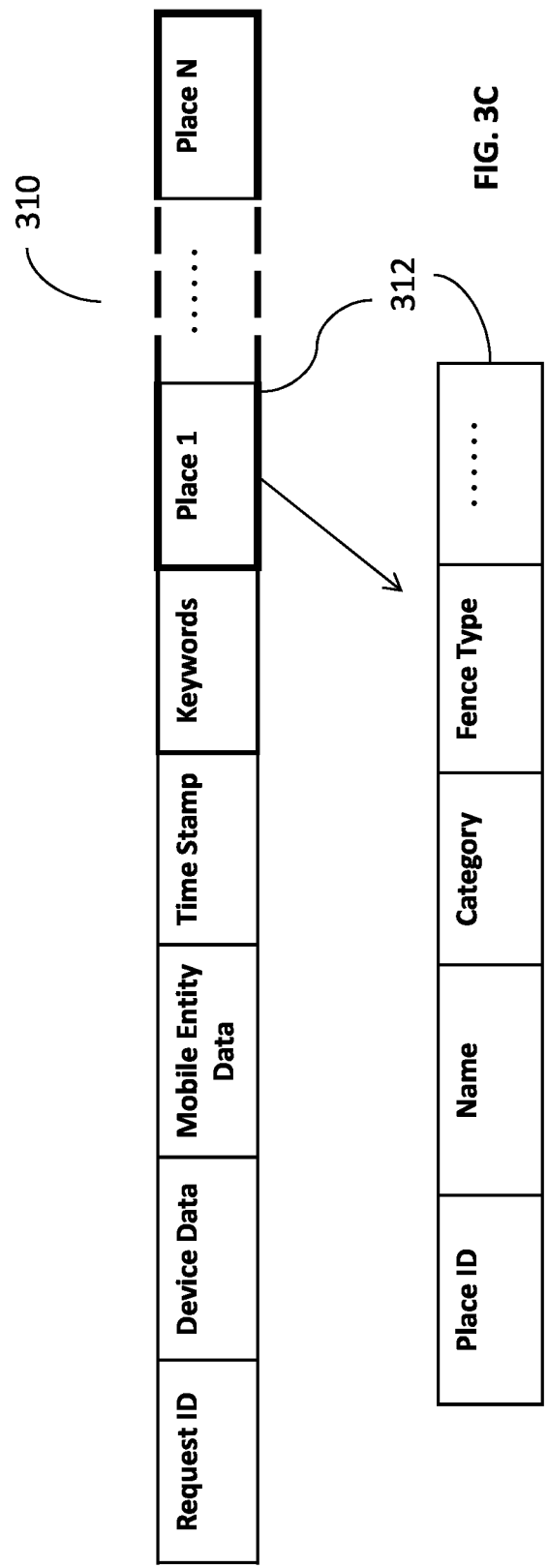

In certain embodiments, as shown in FIGS. 3A-3C, the request processor 152 receives request 301 from the MSP server 140 via network 100, or from a software development kit (SDK) installed on a mobile device. The request 301 includes mobile device location information including a plurality of location components, such as latitude and longitude coordinates (LL), IP addresses (IP), postal or zip codes (ZC), and/or city-state names (CS), etc, in addition to other information. In certain embodiments, the request processor 152 validates the location information by checking the validity and consistency of the location components and by weeding out any invalid location component(s). Generally, the LL is usually believed to be the most useful location component. However, when a mobile entity doesn't allow its location information to be known, mobile applications at the MSP server 140 typically provide only coarse location data in the form of, for example, an IP address, a ZC (e.g. entered by the user at the time of registration), or CS. Thus, mobile applications at the MSP server 140 frequently provide LLs obtained from geo-coding software, which translates ZC, CS, and other points of interests into one representative LL. In one embodiment, such representative LLs are categorized as "bad LLs". A bad LL can be, for example:

1. A centroid of a ZC/CS
2. Any fixed point on a map (e.g. (0,0) or an arbitrary location)

In certain embodiments, the request processor 152 is configured to weed out the bad LL's, so that location data with bad LL's are not provided to the next stage processing, by using the techniques disclosed in commonly owned U.S. patent application Ser. No. 14/716,816, entitled "System and Method for Estimating Mobile Device Locations," filed on May 19, 2015, which is incorporated herein by reference in its entirety.

The request processor 152 estimates the location of the mobile device from the request 301 and generates location data to represent an estimated mobile device location, which may be a geographical point represented by a lat/long pair or one or more probably areas or regions the mobile device is estimated to be in, as shown in FIG. 3B. The search engine 156 queries the spatial index database 158 with the lat/long pair to determine whether the location triggers one or more predefined places in the database 158, and returns the triggered place(s) to the request processor 152, which annotates the request 301 with the triggered place(s) to generate an annotated request 310, and stores the annotated request 510 in the request log 168.

In certain embodiments, as shown in FIG. 3A, the request 301 received from the Internet by the request processor includes other information as well as the location information, such as information about the mobile device and/or a mobile user associated with the mobile device, a time stamp indicating the time of the request (e.g., day, hour, minute, etc.), one or more keywords suggesting types of information for returning to the mobile device, and/or other information associated with the mobile user, the mobile device, and/or the MSP. In some cases, the location data can trigger multiple places. For example, as shown in FIG. 2B, a request that triggers the BC place 410 of Costco Almaden also triggers the BR place 430 of any of the stores in the same business region. Thus, the request may be annotated with the BC place of Costco Almaden and the BR place of one or more other stores in the same business region. As shown in FIG. 3C, each of the one or more places or geo-fences includes either or both of a place ID, a name and/or a category of the POI or its associated brand if any, and a place type (e.g., BC, BP, BR, or circle), some or all of which can be included in the annotated request 310.

Figure 4:
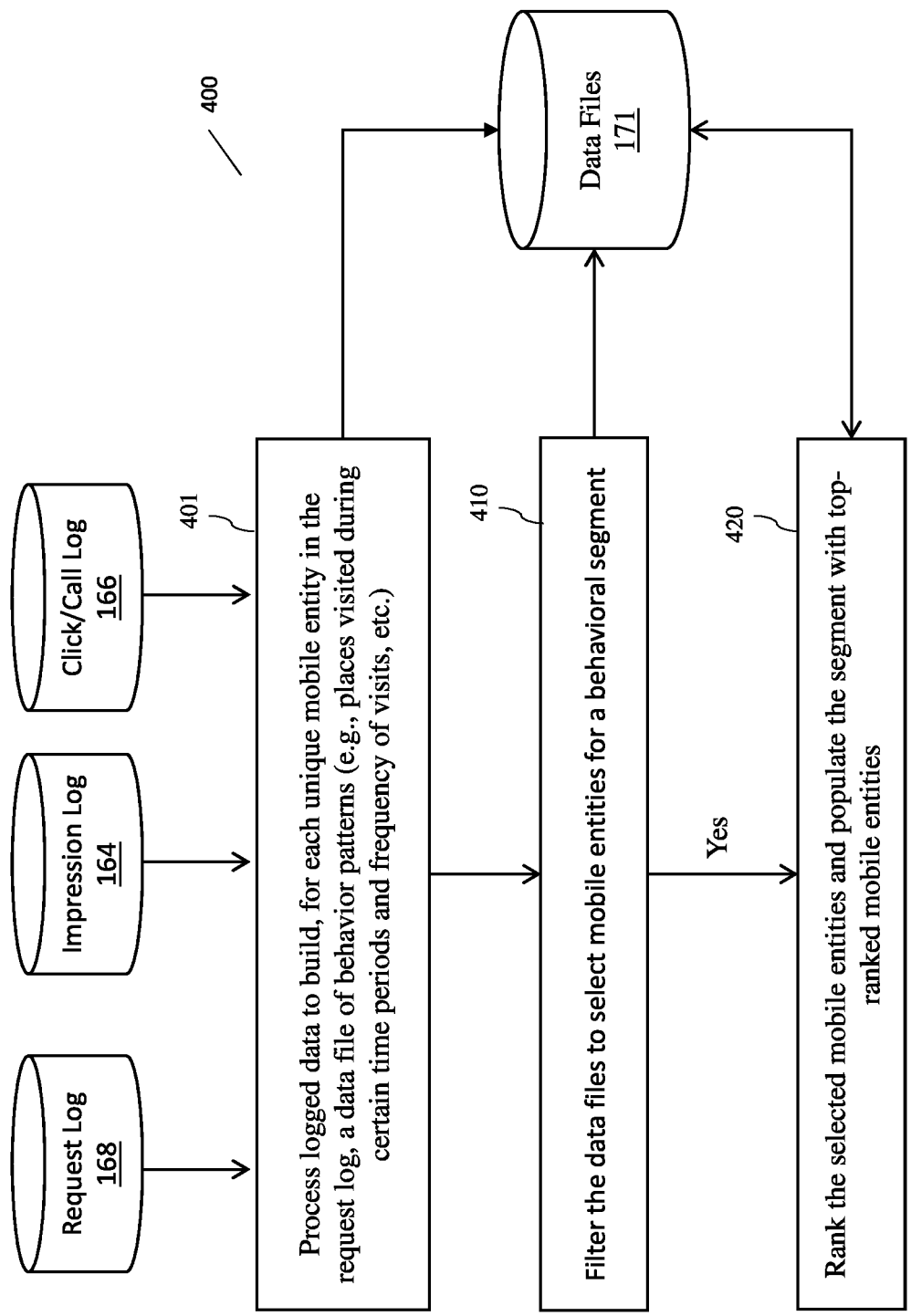
FIG. 4 is a flowchart illustrating a process for building and searching mobile device data files according to certain embodiments.

In certain embodiments, logged data in the request log 168, the impression log 164 and/or the click/call log 166 collected over a period of time (e.g., six months), resulting in a large collection of mobile device data (e.g., millions and millions of annotated requests and impression/click/call events). In certain embodiments, these data are used to build behavioral audience segments, which can be used as an alternative or additional indication of user intent when selecting information to serve to a mobile user in response to a request. As shown in FIG. 4, a process 400 executed in the system 150 for building behavioral audience segments starts by processing (401) logged data collected over a time period (e.g., the past month) to build a data file for each unique mobile entity among a plurality of mobile entities. The data file is structured to capture behavior patterns include, for example, places visited by the user during the time period and frequency of visits. As illustrated by the exemplary data file 500 shown in FIG. 5, the data file can include a plurality of structured data fields, such as a data field populated by mobile entity data (e.g., a UID, demographic features such as age, gender, household income (HHI), and device attributes (like iPhone or Android), carrier information such as AT&T, T-Mobile, etc.), a data field for location history in certain time period (e.g., the past month), a data field for impressions/clicks/calls made on the mobile device within the certain time period. The data file may include additional data fields for, for example, location history in another time period (e.g., the past six months), impressions/clicks/calls made on the mobile device within the same time period.

The data file may additionally or alternatively includes data fields for location histories and impressions/clicks/calls in a certain time slot on each day of a particular time period. For example, each 24 hour period may be sliced into a plurality of hour slots (e.g., hour slot 1 from 11 PM to 5 AM, hour slot 2 from 5 AM to 11 AM, hour slot 3 from 11 AM to 5 PM, and hour slot 4 from 5 PM to 11 PM). The data file may additionally or alternatively includes data fields for location histories and statistical data (e.g., impressions/clicks/calls) for weekdays only during a certain time period, or weekends only during a certain time periods. In certain embodiments, the location histories in the data file 500 includes location features such as brands like Walmart, Safeway etc., and categories/SICs like Restaurants, Grocery Stores, etc., that the mobile entity has visited and the number of times (feature frequency) the mobile entity visited each of the featured locations in the specified time slot during the specified time periods.

In certain embodiments, the data file 500 further includes data fields for non-location features such as various applications (e.g., weatherbug, memo, mapquest) run on the mobile device, and categories of the information files provided to the mobile device to which the mobile entity responded by clicking on the embedded link. For each such feature, the number of times and/or the number of distinct hours the user is seen with the feature are extracted and provided in the data fields as feature frequencies. These counts are kept for each combination of what time of day and what day of week a user is seen.

In certain embodiments, the data file 500 further includes a segments data field to be populated by the names of the segments the mobile entity is determined to belong to at the end of the process 400 and the mobile entities' ranks in the respective segments. These segments are selected from a list of segments, examples of which are provided in Table I below.

TABLE I

| Segment Name | Description |
| --- | --- |
| p21+ | Age 21+ |
| agebracket_20 | age between 21 and 35 |
| agebracket_30 | age between 36 and 50 |
| agebracket_10 | age less than 21 |
| agebracket_40 | agebracket_40 |
| bbs | BigBoxShopper |
| bt | BusinessTraveler |
| car | Car Enthusiasts |
| cr | CarRenters |
| chs | ChildrenShoppers |
| cl | Coffee Lovers |
| com | Commuter |
| cs | ConvenienceShoppers |
| ds | DeptShopper |
| d | Diners |
| dis | DiscountShopper |
| diy | DIY |
| ele | Electronics Enthusiasts |
| ee | Entertainment Enthusiasts |
| ed | EveningDiner |
| fs | FashionShopper |
| fcd | Fast Casual Diner |
| ffs | FastFashionShopper |
| female | female |
| fe | Fitness enthusiasts |
| frequenttravelers | Frequent Travelers |
| gz | Gen Z |
| go | Golfer |
| gs | GroceryShopper |
| gy | Gyms |
| hhhi | High Household Income (>150K) |
| hispanics | Hispanics |
| iab | IMAutoBuyer |
| ic | IMCarriers |
| if | IMFurniture |
| ilab | IMLuxuryAutoBuyer |
| it | InternationalTraveler |
| lnd | LateNightDiner |
| lt | LeisureTraveler |
| ld | LunchDiner |
| lc | Luxury Car Enthusiasts |
| lds | Luxury Dept Shopper |

TABLE I-continued

| Segment Name | Description |
| --- | --- |
| lh | Luxury Hotels |
| lr | Luxury Restaurant |
| ls | LuxuryShopper |
| male | male |
| millennials | Millennials |
| md | MorningDiner |
| mg | Movie-goer |
| ml | Museums Lovers |
| pl | Park Lovers |
| pa | Party Animals |
| pel | Pet Lovers |
| pr | PharmacyRegulars |
| qd | QSR Diner |
| s | Shoppers |
| sdd | Sit-down Diner |
| smb | Small Business Owners |
| soccermoms | Soccer moms |
| sportsenthusiasts | Sports Enthusiasts |
| vda | Verified Legal Drinking Age (LDA-Compliant) |

Since there is one-to-one correspondence between the data files and mobile entities or users, the data files and their associated mobile entities/users are sometimes referred to interchangeably.

Figure 6A:
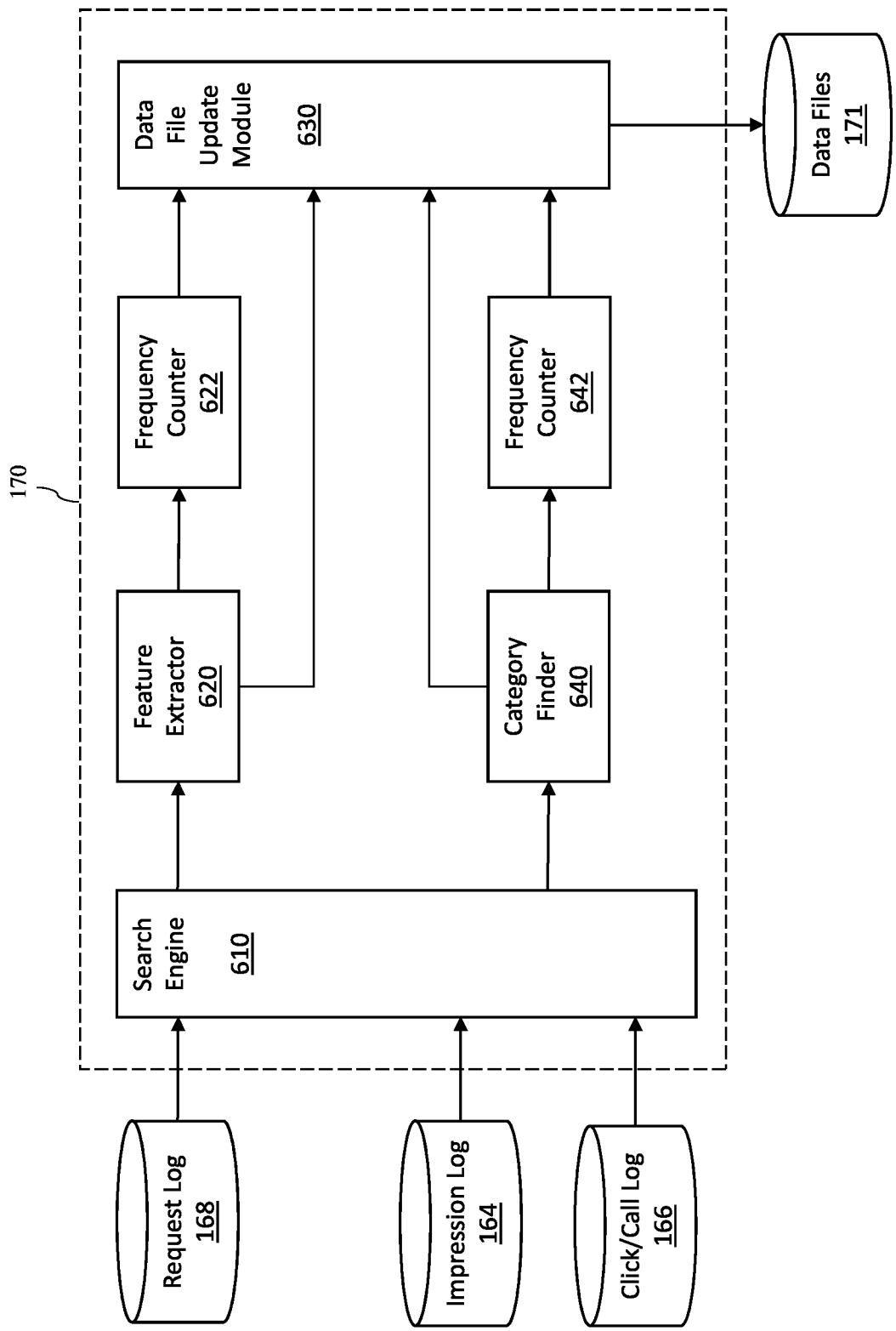
FIG. 6A is a block diagram of a data file builder according to certain embodiments.

As shown in FIG. 1B, the system 150 further includes a data file builder 170 configured to build the data files. In certain embodiments, as shown in FIG. 6A, the data file builder 170 includes a search engine 610 configured to search the request log 168 for entries associated with each particular mobile entity of a plurality of mobile entities. The data file builder 170 further includes a feature extractor 622 configured to extract features in matching annotated requests 310 returned by the search engine. The non-location features such as device data and mobile entity data are extracted only once. For the location features and features related app usage, the data file builder 170 further include a frequency counter that counts unique occurrences of extracted location features or usage of an app. In certain embodiments, the counter add one count to a location feature or app when it is first extracted from a matching annotated request, and if another occurrence of the same location feature shows up, it determines whether the other occurrence is a unique occurrence based on the time stamps of the other occurrence and the previous occurrence, the apps involved, and other circumstantial data. The counter adds another count to the feature frequency for a respective time period and/or hour slot each time it is determined that the new occurrence indicates another visit to an associated place or another usage of an app by the mobile entity. The data file builder 170 further includes a data file update module 630 configured to update the data file associated with the particular mobile entity by filling in the appropriate fields the features extracted from the search results and/or update the frequency counts based on the output from the frequency counter.

In certain embodiments, the search engine 610 is also configured to search the impression log 164 and click/call log 166 for entries associated with the particular mobile entity. Each impression log entry returned by the search engine 610 may include, for example, a doc ID identifying an information document that was impressed on the particular mobile device, some information of the sponsor of the information document or a place associated with information document, such as a brand, category, or name of the place, etc., and a time stamp indicating when the impression was made. Each click/call log entry returned by the search engine 610 may include, for example, a doc ID identifying an information document including that link that was clicked on the particular mobile device and/or the phone number that the mobile device was used to call, some information of the sponsor of the information document or a place associated with information document, such as a brand, category, or name of the place, etc., and a time stamp indicating when the click/call was made. The data file builder 170 further includes a category finder 640 configured to receive each impression log entry or click/call entry returned by the search engine 610 and determine the category of associated information document. The data file builder 170 further includes frequency counter that counts the number of clicks or calls made on the particular mobile device in a particular category for the respective time period and/or hour slot. The data file update module 630 is further configured to update the data file associated with the particular mobile entity by filling in the appropriate fields based on the output from the frequency counter.

Table II below illustrates portions of a few exemplary data files, where each entry next in the column "Past 1 month" shows a place (associated with a brand) a respective user visited in the past one month and where each entry in the column "Past 6 months" shows a place (associated with a brand) the respective user visited in the past six months, with the number next to each place indicating a number of times the place has been visited, or a frequency of visitation. Although only entries for past 1 month and past 6 months are shown here, similar entries could be in other time frames too. Table II also shows some processed statistical data such as number of impressions, clicks and calls made by the user in the past 6 months. Table III and Table IV below illustrates a few additional exemplary data files, in which the counts are made with respect to time slices within the 1 month and 6 month windows. These time slices correspond to various hour slots (e.g., hour slot 1: 11 PM to 5 AM, hour slot 2: 5 AM to 11 AM, hour slot 3: 11 AM to 5 PM, and hour slot 4: 5 PM to 11 PM), or weekdays or weekends, or combinations of hour slot and weekdays or weekends, and the detected mobile device activities are tracked corresponding to each of these combinations.

Thus, there can be different histories based on different time periods from which request data is used, and this time period information can be made part of a segment definition. For example, the In-the-Market Luxury Car Shopper segment may use request data from the past one month, while Business Travelers segment may use request data from the past 6 months. When an incoming request is related to a user (e.g., User1), and both of these segments are eligible (assuming campaigns are running targeting both of these segments of users), the ad server can give higher weight to In-the-Market Luxury Car Shopper segment since it is more time-sensitive (the user) may not belong to this segment for a long time, while he is likely to be associated with Business Travelers for a longer period), thus increasing overall opportunities of serving ads to users.

TABLE II

| Mobile Entity | Location Feature Past 1 month | Location Feature Past 6 months | #Impressions Past 6 months | #Clicks | #Calls |
|---|---|---|---|---|---|
| User1 Age: 35 Gender: male | (BMW, 2) (Mercedes, 1) (Home depot, 1) (Safeway, 3) (SFO, 2) (Marriott, 4) | (BMW, 2) (Mercedes, 1) (Home depot, 2) (Safeway, 20) (SFO, 2) (Marriott, 10) | 200 | 3 | 1 |
| User2 Age: 39 Gender: Female | (Mercedes, 2) (Lexus, 1) | (Mercedes, 2) (Lexus, 1) (Safeway, 5) (Marriott, 5) (Days Inn, 2) | 180 | 6 | 1 |
| User3 Age: 18 Gender: Male | (Audi, 1) (Nordstrom, 1) (Marriott, 2) (SFO, 1) | (Audi, 2) (Nordstrom, 1) (Marriott, 2) | 250 | 4 | 0 |
| User4 Age: 25 Gender: Female | (Safeway, 3) (Audi, 1) | (Safeway, 25) (Home depot, 3) (Audi, 5) (LAX, 3) Marriott(5) | 300 | 10 | 3 |

TABLE III

| Mobile Entity | Past 1 month, hrSlot 1, weekDay | Past 6 months, hrSlot 1, weekDay | #Impressions | #Clicks | #Calls |
|---|---|---|---|---|---|
| User10 Age: 28 Gender: male | (Home depot, 2) (Safeway, 3) (SFO, 2) (Marriott, 4) | (BMW, 1) (Home depot, 5) (Safeway, 20) (SFO, 2) (Marriott, 10) | 100 | 5 | 0 |

TABLE III-continued

| Mobile Entity | Past 1 month, hrSlot 1, weekDay | Past 6 months, hrSlot 1, weekDay | #Impressions | #Clicks | #Calls |
|---|---|---|---|---|---|
| User 18 Age: 42 Gender: Female | (Ford, 5) | (Ford, 20) (Safeway, 4) | 120 | 8 | 1 |

TABLE IV

| Mobile Entity | Past 1 month, hrSlot 1, weekEnd | Past 6 months, hrSlot 1, weekEnd | #Impressions | #Clicks | #Calls |
|---|---|---|---|---|---|
| User10 Age: 28 Gender: male | (Home depot, 1) (Safeway, 2) | (BMW, 1) (Home depot, 2) (Safeway, 7) | 20 | 2 | 0 |
| User 18 Age: 42 Gender: Female | (Ford, 1) | (Ford, 2) (Safeway, 8) | 40 | 5 | 0 |

Figure 6B:
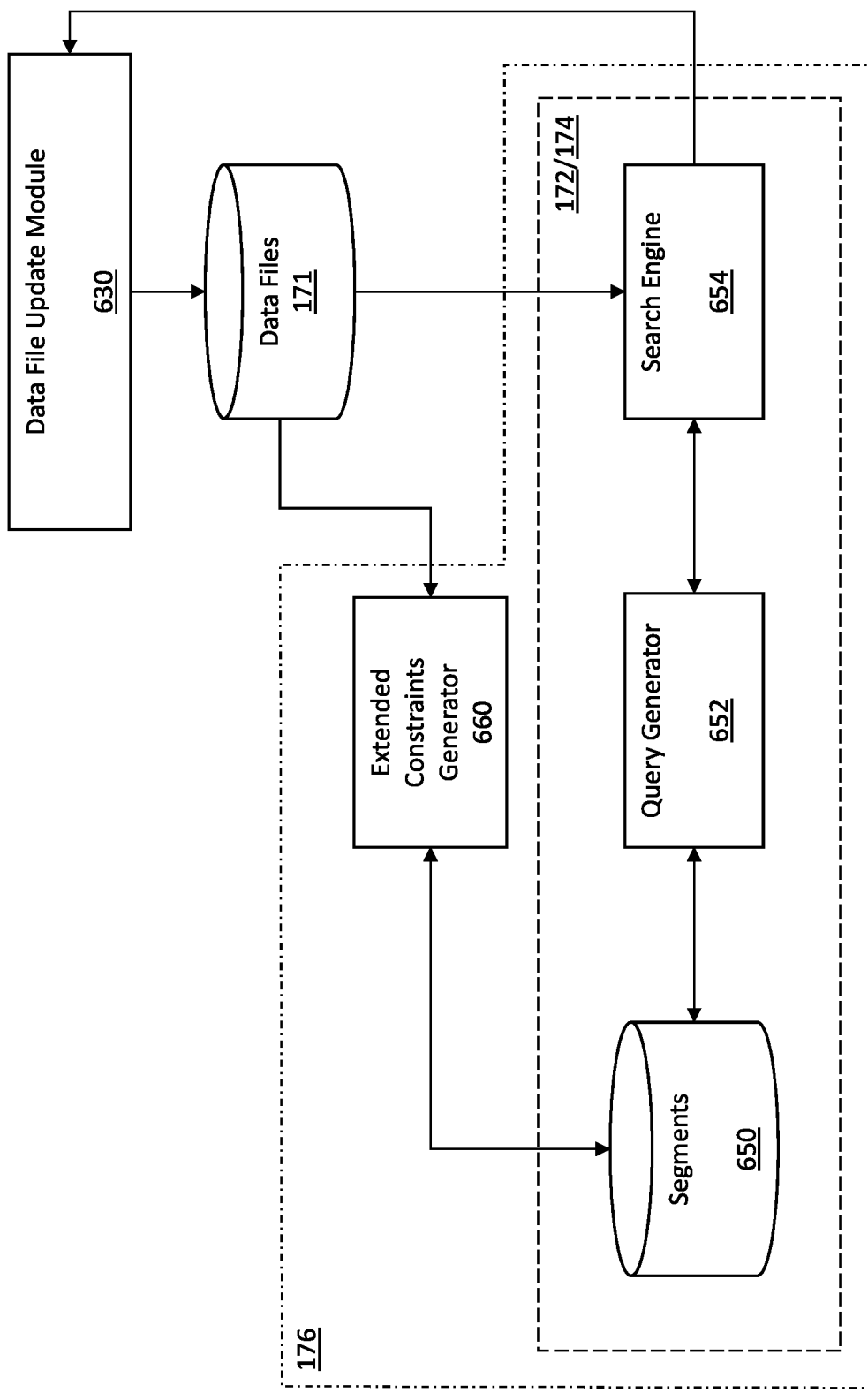
FIG. 6B is a block diagram of a set of filters in the system for characterizing mobile entities according to certain embodiments.

In certain embodiments, a plurality of filters are applied to the data files to identify mobile entities for a particular behavioral segment. As shown in FIG. 1B, the plurality of filters include a hard constraint (HC) filter 172, a soft constraint (SC) filter 174, and an extended constraint (EC) filter 176. As shown in FIG. 6B, the HC filter 172, the SC filter 174 and the EC filter 176 may share certain components, which include a segment database 650, a query generator 652, and a search engine 654. The EC filter 176 further includes an extended constraints generator 660.

The segment database 650 stores therein a list of segments and their associated data, such as a set of related features for each segment, a set of hard constraints for each segment, and a set of soft constraints for each of at least some the list of segments, etc. At the start of the segmentation process, each segment is defined by hard and soft constraints, and these constraints vary from segment to segment. For each segment, the hard constraint (HC) may include a set of conditions a data file needs to satisfy in order to be associated with the segment. These conditions are selected, for example, to help remove employees of a matching brand and shared user IDs, and also to satisfy age and gender requirements. Further, the conditions may include whether a data file needs to have location features. The set of conditions may include, for example,

- Age
- Gender
- Presence of location features in specified time period and/or specified hour slot
- The user ID (UID) is not a shared UID
- The user is not an employee at a particular brand The soft constraint (SC) may be that a user needs to satisfy one or more of a set of conditions, such as:
- a CORE set of features
- Minimum number of features in a data file that match features in the CORE set of features
- Minimum number of location features in a data file that match location features in the CORE set of features
- Overall frequency thresholds for certain matching features Below are some examples for illustration purposes:
Segment 1—In-the-Market Luxury Car Shoppers:
Hard constraints: age>21; location features required; sharedUIDThreshold=200; employeeFreq-144;
Soft constraints: Time period—Past 1 month; Time Slice—weekdays; {BMW, Audi, Mercedes}; number of matching features>=2; overall frequency>=2
Segment 2—Business travelers:
Hard constraints: age>21; location features required; sharedUIDThreshold=200; employeeFreq-144 (week days only)
Soft constraints: Time period—Past 6 months; {SFO, LAX, Marriott, Hertz}; number of matching features>=2; overall frequency>=4
Segment 3—Golfers:
Hard constraints: location features required; sharedUIDThreshold=200; employeeFreq-144;
Soft constraints: Time period—Past 12 months; {golf courses, golf putting greens}; number matching features>=1; overall frequency>2
Segment 4—Contractors:
Userstore history—Past 6 months, hourSlot1, weekDay
Hard constraints: location history only; sharedUIDThreshold=200; employeeFreq-144;
Soft constraints: {Homedepot, Lowes}; matching features>=1; overall frequency>2
Segment 5—Grocery Shoppers—Commuting:
Userstore history—Past 6 months, hourSlot3, weekday (users who are likely to go to a grocery store as they are commuting back home from work)
Hard constraints: location history only; sharedUIDThreshold=200; employeeFreq-144;
Soft constraints: {Safeway, Albertsons, . . . }; matching features>=2s; f overall frequency>3

Employee frequency threshold is used to exclude employees of a place, whose associated data files will include a high frequency for the place. Shared UID threshold is used to exclude those UIDs that are not real UIDs. Overall frequency is the sum of the frequencies of the matching features in a data file. Minimum number of matching features in the above definitions is important to make sure that a user is likely to belong to that segment, and that users who may go to only one type of place a lot of times are not included. This feature is more important for some segments like In-the-Market Luxury Car Shoppers (hence, number matching features>=2) while less important for segments like golfer (hence, number matching features>=1). A binary inclusion/exclusion rule can be used. For example, according to the above Luxury Car Shoppers definition, and given the tiny snapshot of a few exemplary data files in Table II, User1 satisfy the constrains while User3 does not because he does not meet the age condition in the hard constraint. User2 and User4 also do not satisfy the constraints because they are seen only at one brand (and presumably went for servicing and not buying). Similarly, for Business Travelers segment, User1 and User4 satisfy both minimum number of features constraint of 2, and minimum frequency of visits of 4. User2 satisfies the frequency constraint, but not the minimum features constraint, and user3 satisfies the minimum features, but not the frequency constraints, nor the age constraint.

Figure 7A:
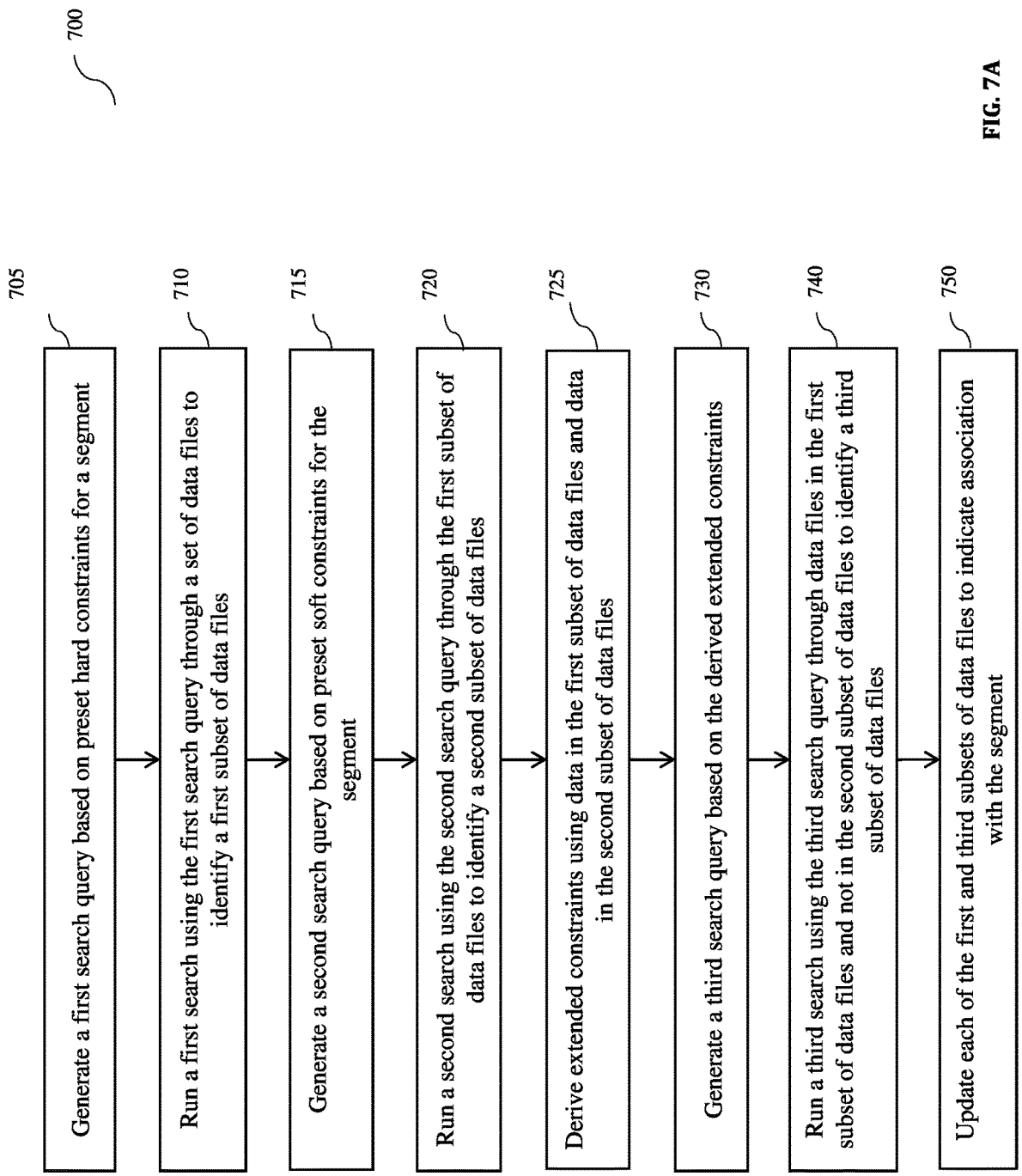
FIG. 7A is a flowchart illustrating a process carried out by the set of filters according to certain embodiments.
Figure 7B:
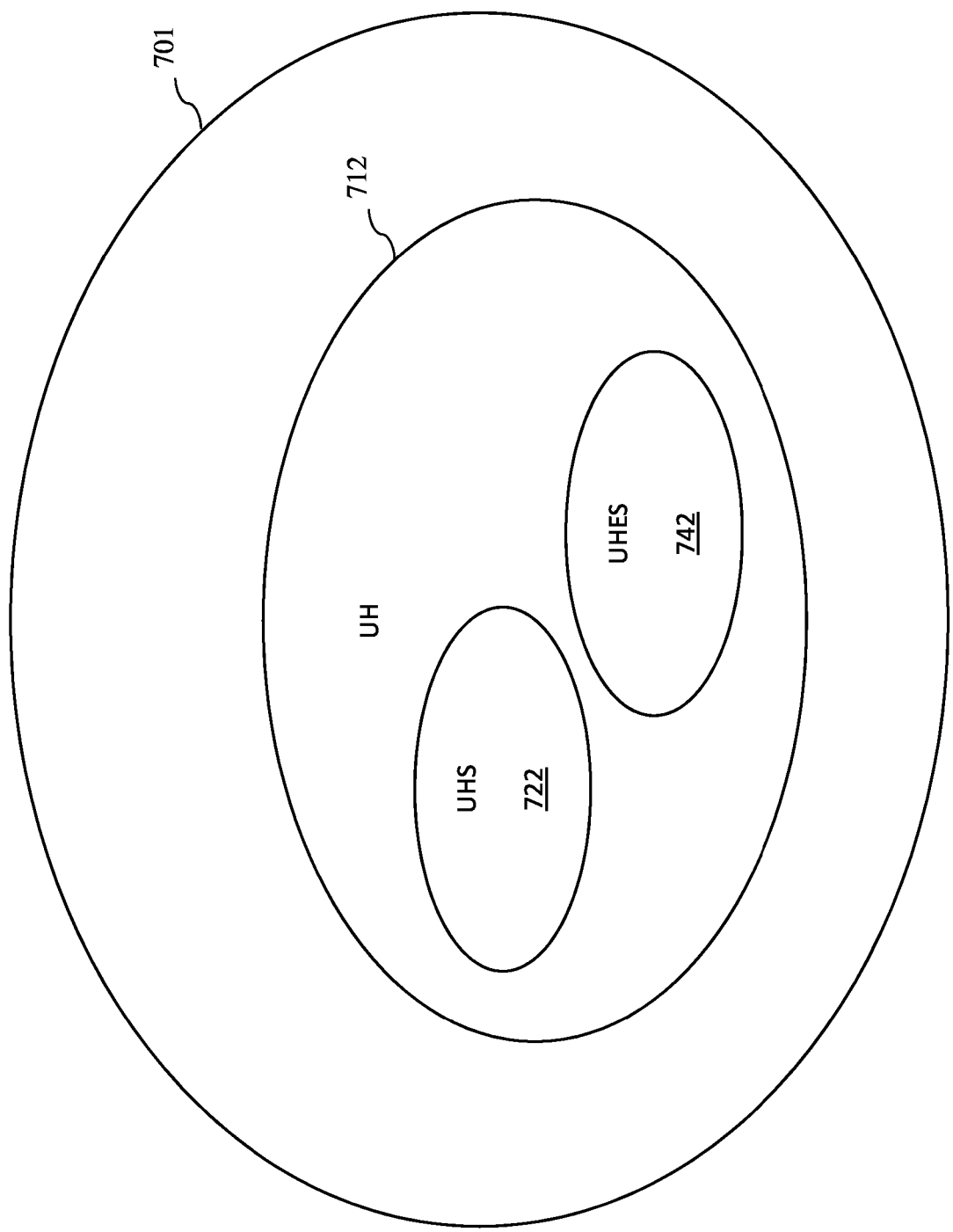
FIG. 7B is a diagram illustrating subsets of data files according to certain embodiments.

In certain embodiments, the filters 172/174/176 together perform a process 700 illustrated in FIG. 7A for each segment. The query generator 652 is configured to generate (705) a first query from the hard constraints of each segment and the search engine 654 is configured to run a first search (710) using the first search query through a set of data files (shown as data files in circle 701 in FIG. 7B) in the database 171 to identify a first subset of the data files that satisfy the hard constraint (shown as data files in circle 712 in FIG. 7B). The query generator 652 is further configured to generate (715) a second query from the soft constraints of each segment and the search engine 654 is configured to run a second search (710) using the second search query through the first subset of data files to identify a second subset of the data files that satisfy the soft constraints and the hard constraints (shown as data files in circle 722 in FIG. 7B).

Figure 7C:
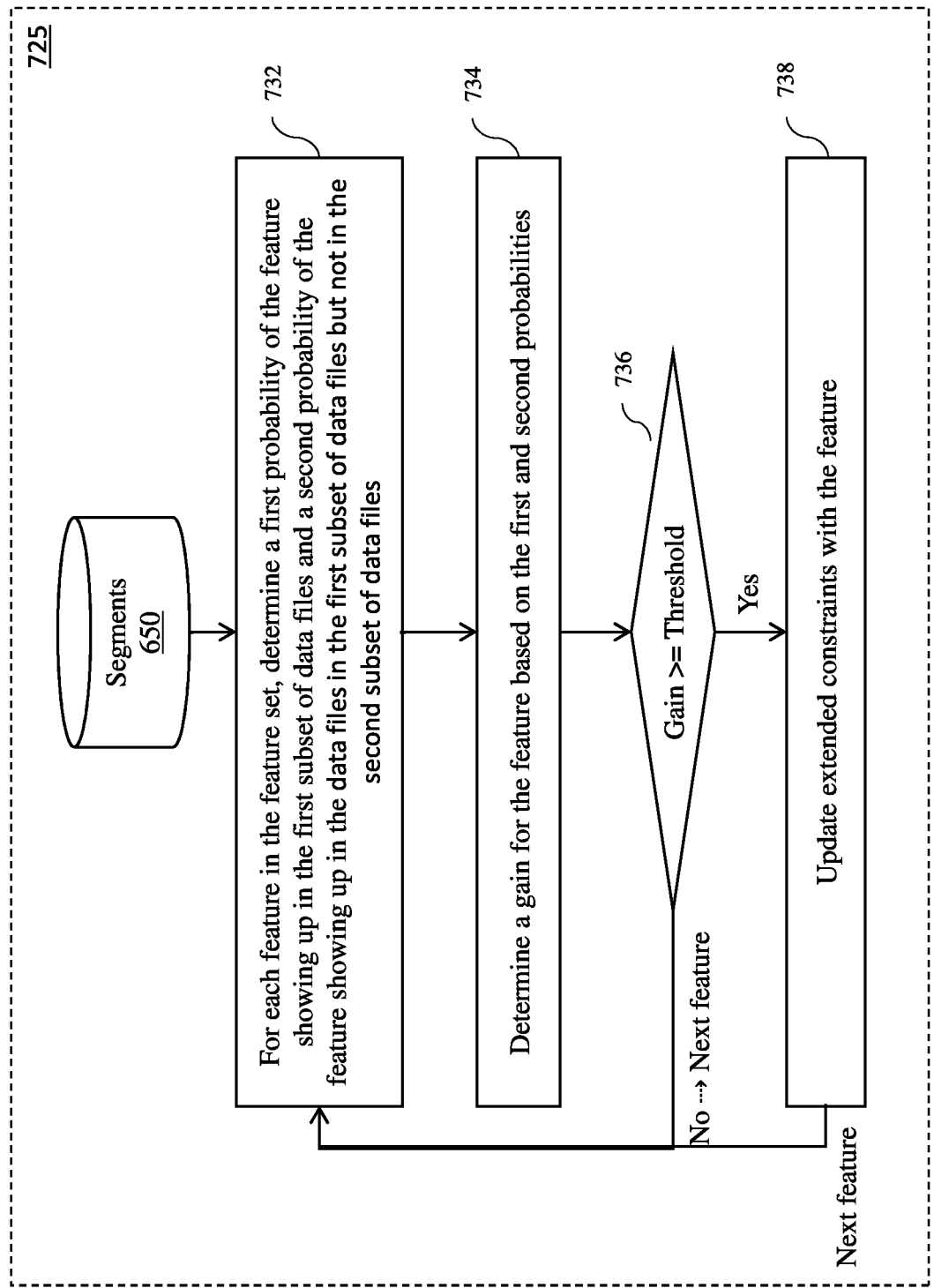
FIG. 7C is a flowchart illustrating a process for deriving extended constraints according to certain embodiments.
Figure 7E:
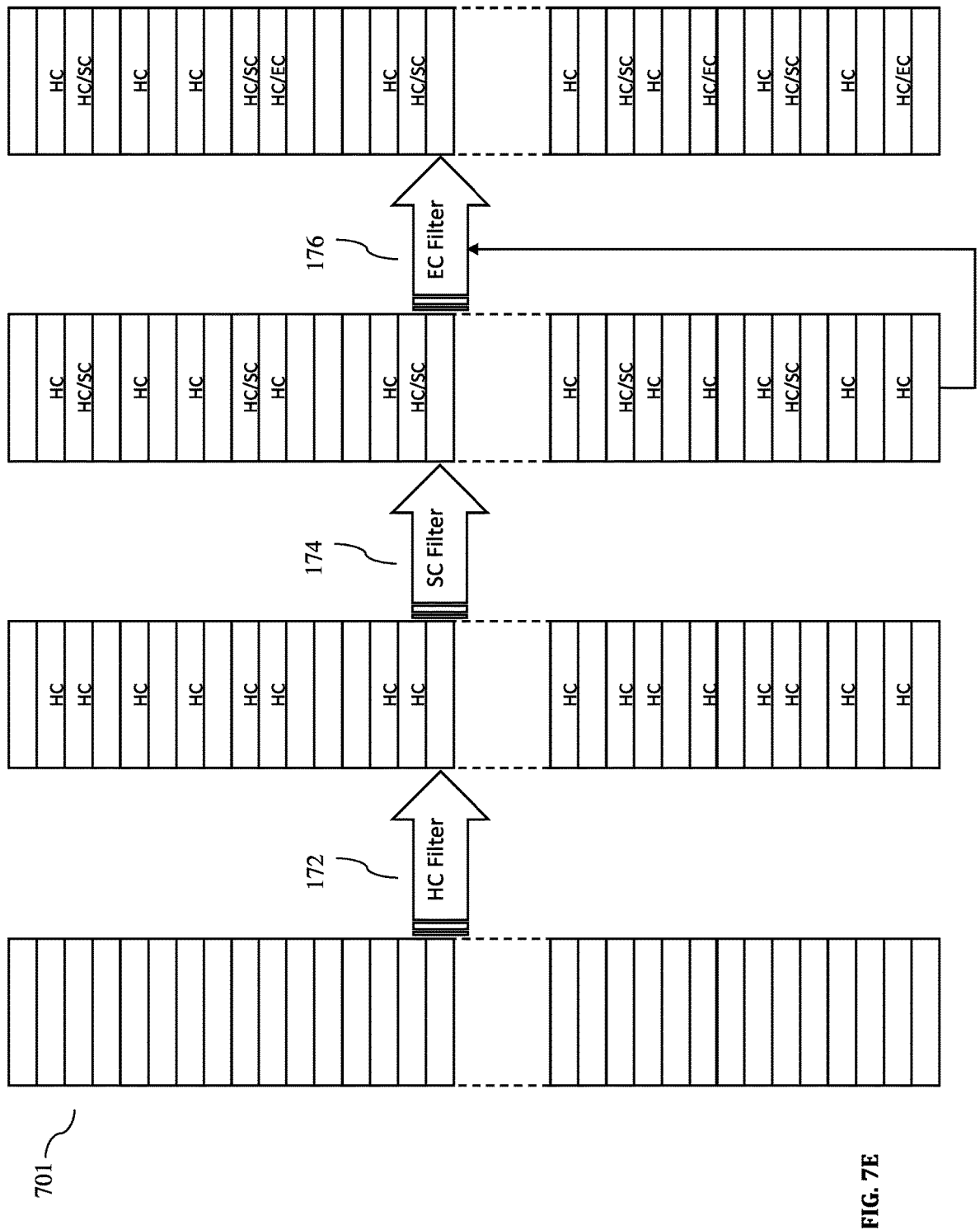
FIG. 7E is a diagram illustrating a set of data files at different stage of filtering according to certain embodiments.

In certain embodiments, as shown in FIG. 7E, the data files satisfying the hard constraints are tagged for the next stage processing, which includes a SC filter process. If a data file also satisfies the soft constraints, the associated mobile entity is tagged as belonging to the segment. In certain embodiment, the data file update module 630 receives the output from the search engine 654 and tag each of the second subset of data files 722 with the name of the segment, as shown in Table V below. Those UIDs in the data files satisfying the soft constraint are called the CORE set of UIDs (UHS), as represented by the circle 722 in FIG. 7B. The UIDs in the data files that satisfy the hard constraint but not among the core set are considered potential UIDs.

The extended constraints generator 660 is configured to generate extended constraints based on data in the first set of data files and the second set of data files. In certain embodiments, the process 700 further comprises a segment redefinition process in which an extended constraint is determined 725 and the segment is redefined with the extended constraint in order to bring more users from the potential UIDs into the segment. Users who satisfy the extended soft constraint (UHES) are made a part of the segment using a subsequent extended constraint filter process, in which the query generator 652 generates (730) a third query from the extended constraints and the search engine 654 runs a third search (710) using the third search query through data files that are in the first subset of data files but not the second subset of data files to identify a third subset of the data files that satisfy the extended constraints and the hard constraints (shown as data files in circle 742 in FIG. 7B). The users in the third subset of files are the potential users who satisfy the extended constraint and they are called the extension set of UIDs.

TABLE V

| User | Past 1 month (Brand, Freq) | Past 6 months (Brand, Freq) | #Imp | #Clicks | #Calls | Segments/ Ranks |
|---|---|---|---|---|---|---|
| User1 Age: 35 Gender: male | (BMW, 2) (Mercedes, 1) (Home depot, 1) (Safeway, 3) (SFO, 2) (Marriott, 4) | (BMW, 2) (Mercedes, 1) (Home depot, 2) (Safeway, 20) (SFO, 2) (Marriott, 10) | 200 | 3 | 1 | Lux_Car/ xxxxxx Biz_Travel/ xxxx |
| User2 Age: 39 Gender: Female | (Mercedes, 2) (Lexus, 1) | (Mercedes, 2) (Lexus, 1) (Safeway, 5) (Marriott, 5) (Days Inn, 2) | 180 | 6 | 1 | Biz_Travel/ xxxx |
| User3 Age: 18 Gender: Male | (Audi, 1) (Nordstrom, 1) (Marriott, 2) (SFO, 1) | (Audi, 2) (Nordstrom, 1) (Marriott, 2) | 250 | 4 | 0 | |
| User4 Age: 25 Gender: Female | (Safeway, 3) (Audi, 1) | (Safeway, 25) (Home depot, 3) (Audi, 5) (LAX, 3) Marriott(5) | 300 | 10 | 3 | Biz_Travel/ xxxx |

FIG. 7C is a flowchart illustrating the segment redefinition process 725 according to certain embodiments. As shown in FIG. 7C, the process 725 starts with identifying a feature set related to the segment, which can be some or all of the features stored in the segment database 650. For each feature f in the feature set, a first probability Pr(f|S) of the feature showing up in the second subset of data files 722 and a second probability Pr(f|P) of the feature showing up in data files associated with the Potential set UID' a (i.e., data files in the first subset of data files 712 but not in the second subset of data files 722) are determined (732). Then, a feature gain for the feature f is determined (734) as:

FG=(Pr(f|S)/Pr(f|P))

which indicates how much more likely it is to find the feature in the data files associated with the core set of UIDs than the data files associated with the potential UIDs.

If this feature gain is larger than a certain threshold (736), then it is used to redefine the segment (738). In certain embodiment, the threshold is defined as k=|UHP|/|UHS| where |UHP| is the number of users in the potential set of users and |UHS| is the number of users in core set of users, and k is a coefficient, which can be adjusted to increase or decrease the number of extended UIDs (UHES) based specific requirements. For example, L>=k>=¼.

Threshold can also be defined based on the distribution of the FG values of all preset soft constraints. A minimum of these FG values, or the $1^{st}$ quartile value of the distribution, can be used as the threshold.

In certain embodiments, the above segment redefinition process 725 is based on the following assumptions:

|UHES|<<|UHP|. (If original definition is reasonably complete, but could miss some constraints, then this assumption is reasonable.)

Pr(f|RS)>>Pr(f|NRS)—probability of a feature, f, occurring for a user in a relevant user set, RS, is much greater than the probability of finding that feature in a non-relevant set, NRS, of users.

Using the above the Luxury Car Shopper segment as an example, as illustrated in the table in FIG. 7D, UH is the subset of users who satisfy the hard constraints, and UHS is the set of all users who satisfy the hard and soft constraints—let its size be 1603536 as given in the table. The UHP is all users satisfying the hard constraints, but not in core set—its size is given as 105613882 in the table. The threshold used in FG computation step above is (105613882/1603536)=66 (k=1).

Taking each feature in the data files, Pr(f|S) is computed. For example, for the feature GMC, 278328 is the number of users having this feature in UHS, and so this probability Pr(f|UHS)=(278328/1603536)=0.173571407. Similarly, Pr(f|UHP) is determined for each feature. For the GMC feature, this will be (63964/105613882)=0.060564008. Next, gain for each feature is determined. For example, for the GMC feature, this gain FG=(0.173571407/0.060564008)= 286.5916784. Since the extension features are those features whose gain is higher than |UHP|/|UHS|=66, in the Luxury Car Shopper segment, only the feature GMC meets this criterion. Thus, the feature GMC is added to the list of brands in the soft constraint of the Luxury Car Shopper segment, and each user in the UHP is filtered through the soft constrain again in process 1115 to determine if the user satisfy the extended soft constraint. This results in a new set of EXTENSION users (UHES) who will then be added to the original CORE/UHS set of users in the segment.

As another example, for Business Travelers segment, it is possible to end up with "Days Inn" as a new feature and hence end up adding User2 from UHP into UHES since User2 now matches the extended soft constraint. Similarly, if "Lexus" ends up being added as a new feature to the In-the-Market Luxury Auto Shoppers segment, then User2 can be added to the UHES of that segment.

In another embodiment, all the POTENTIAL users are added to the CORE/UHS set of users, and ranking is used to sort out the users by giving a much higher weight to the users matching the soft constraint, as discussed below.

In certain embodiments, as shown in FIG. 1B, the system 150 further includes a ranking module 178, which is configured to rank the UIDs in both the CORE set and EXTENSION set of UIDs based on the location features matched, non-location features matched, the feature gain of a feature, and the frequencies of individual features. Location features weigh much more than non-location features so that more accurately measured ones have more weight. In certain embodiment, ranking is done by determining a score for each user in the segment. For example, $$\text{Score} = \sum_{C \text{ in } P} FG_c * W_P * Freq_c + \sum_{C \text{ in } L} FG_c * W_L * Freq_c + \sum_{C \text{ in } NL} FG_c * W_{NL}$$

where P is the set of polygonal location features (place type being one of BC, BP, or BR), L is the set of non-polygonal location features (place type being, for example, a circle), and NL is the set of non-location features; $W_P$ is the weight of the polygonal location features, $W_L$ is the weight of any non-polygonal location feature; $W_{NL}$ is the weight of any non-location feature and is much smaller than weight of a location feature.

As an example, assume that the relative weights are set as: $W_P=4$, $W_L=2$, $W_{NL}=1$. With the Luxury Car Shoppers segment, and the relevant features are: BMW, Mercedes, Lexus, Audi, and new extended feature, GMC. Assume that BMW and Mercedes are polygonal features (e.g., mobile devices are located with respect to a polygonal geo-fence, as discussed above), and Lexus, Audi are non-polygonal location features (e.g., mobile devices are located with respect a conventional circular geo-fence), and there is no non-location features. Further assume that the FGs as computed above are: (BMW–2000, Mercedes=1500, Lexus=1300, Audi–1800, and GMC=286). So, the polygonal part of the score for this specific example for Users1 would be:

$$\sum_{C \text{ in } P} FG_c * W_P * Freq_c =$$
$$FG_{BMW} * W_P * 2 + FG_{Mercedes} * W_P * 1 = 2000 * 4 * 2 + 1500 * 4 * 1$$

while the score for User2 would be:

$$\sum_{C \text{ in } P} FG_c * W_P * Freq_c = FG_{Mercedes} * W_P * 1 = 1500 * 4 * 2$$

Similarly, all other portions of the overall score can be computed.

Having ranked the users based on the above score, the top required number of users, or top certain percent of users, can be selected as the users for the segment.

So far, the model depended only on a user's historical data including location and some other attributes. In certain practices, engagement metrics based on clicks and secondary actions, such as calls and store-visits, are often used post campaigns to measure the effectiveness of the segmentation process. As information campaigns are run based on initially built segments as described above, click and secondary action events are collected from those users who engaged with the MSPs. This can form as a feedback loop into the ranking process. Hence, the above ranking formula to compute the ranking score can be modified as:

Score3=α*Score1+(1−α)*Score2+β*eCTR+γ*eSAR where Score1 is Score computed over all original and extension features chosen as earlier, while Score1 is Score computed over the rest of the features, α is a parameter to control a relative weight between Score1 and Score1, β and γ are parameters controlling relative weight of estimated CTR (Click Through Rate), and estimated SAR (Secondary Action Rate). Estimated CTR=#Clicks/#Impressions, and Estimated SAR=#Calls/#Clicks Both of the above can be determined from data in the entries in associated data file for impressions, clicks, and calls for each user, and used in the above formula when computing the score of the user. Thus, the modified ranking formula trades among location visitation metrics with CTR, and SAR in most cases. The $\alpha$, $\beta$, and $\gamma$ parameters can be chosen somewhat arbitrarily. Alternatively, the various Score1, Score2, eCTR, eSAR portions can be normalized to appropriate values, and a regression approach can be adopted to estimate those parameters.

Thus, a large number of segments can be generated using core and extension sets of UIDs, as described above. In certain embodiments, additional UIDs can be added to a particular segment using document-modeling techniques and search technology to obtain look-alike users to a seed list of users provided to the query generator as input (as shown in FIG. 1B). The seed list of users can also be taken from those already in the segment (e.g., the core set of users). Thus, the originally extremely high dimensional raw data in the request database is transformed into behavioral and location segments etc. along with demographic data, and is used in a document-modeling or query search process 800 shown in FIG. 8A to search for 2nd-level look-alike users. In certain embodiments, the query search process 800 is carried out by the query generator 180 and the search engine 182 (shown in FIG. 1B). As shown in FIG. 9A, the query generator 180 includes a feature extractor 910, an index builder 920, a database 925 for storing the search index, and a query builder 930.

Figure 8A:
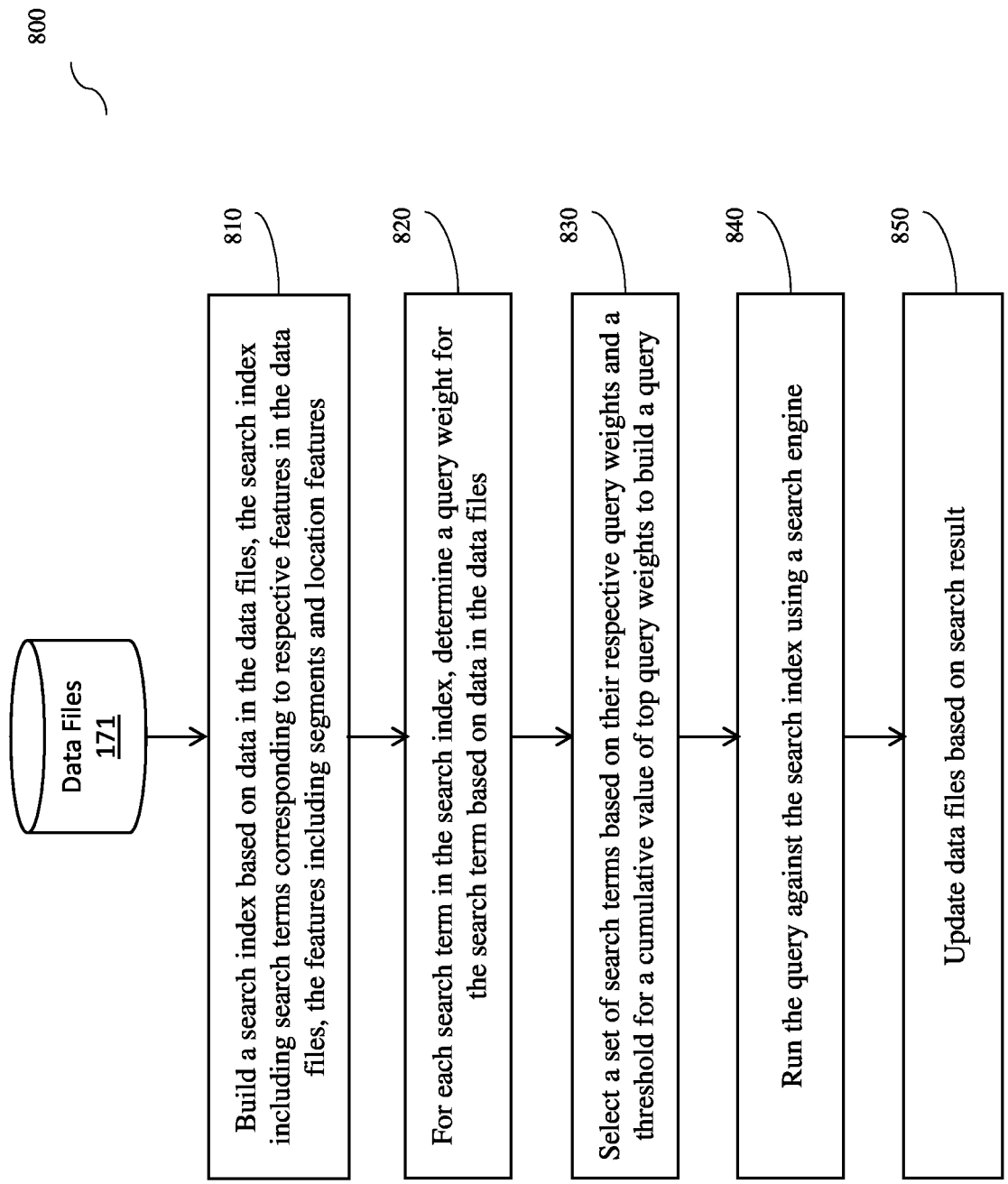
FIG. 8A is a flowchart illustrating a process to search for 2nd order look-alike users according to certain embodiments.
Figure 9A:
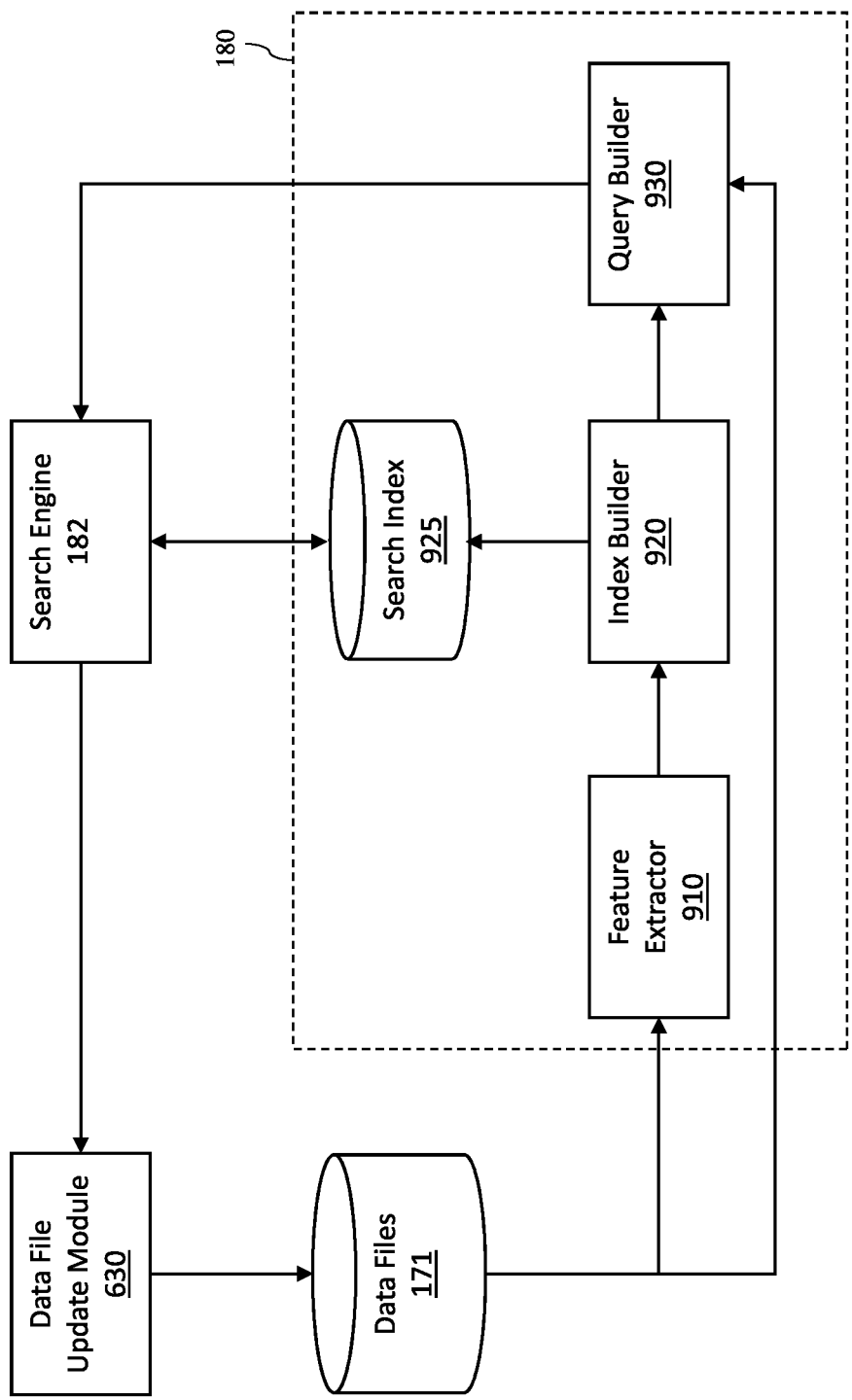
FIG. 9A is a block diagram illustrating a query generator in the system for characterizing mobile entities according to certain embodiments.

As shown in FIG. 8A, the query search process 800 includes block 810, in which the feature extractor 910 extracts features from the data files and the index builder builds a search index including search terms corresponding to respective features in the data files (e.g., segments and location features.) In certain embodiment, as discussed above, each data file corresponds to a respective user, and the terms of the data file may include, for example:

Demographic attributes—age, gender, agebracket
   For each distinct value of age, agebracket and gender will be a separate term. For example, agebracket_10 will be the term for a user with age in the range of 13-21, and gender_m will be for a user with gender male etc.

Behavioral segments in the userstore like soccermoms, Luxury Car Shoppers etc.

Location audience
   Users who visited some top brands and top SICs like Walmart, Target, Auto, Grocery etc. Each of these will lead to a separate segment The term frequency is set to 1 for each of these implicitly since they occur only once.

For example:
User1: (p21, gender_m, agebracket_10, Walmart, MusicLovers, soccermoms, Target, Airports, . . . )
User2: (Target, Safeway, Luxury Car Shopper, Pizza Lover . . . )

In certain embodiments, data files with required values can be loaded into Elastic Search. As illustrated in Table VI below, for each of the terms/segments uploaded to a Search Index, the number of UIDs with the term/segment is kept track of In Table VI, the input users (or additional set of users) can be an arbitrary set of users given by a customer, and/or the users in UH and not in the segment. The task now is to find 2nd order look-alike users among the input users.

In certain embodiment, as shown in table VI, for each search term in the search index, a first number of user data files with the search term within the particular segment and among the additional set of users and a second number of user data files with the search term within the particular segment are determined, as exemplified by the numbers in the column "#UIDs in input and Segment," and thereafter, as shown in FIG. 8A, the query builder determines a query weight for the search term (820), as exemplified by the numbers in the column "Normalized Query Weights." Then, a set of search terms is selected based on their respective search weights and a threshold for a cumulative value of top query weights (830). With the query terms and query weights, a query if formed by the query builder and is used by the search engine 182 to run a search (840) through the data files against the search index. The search engine 182 returns a set UIDs in a decreasing order of a matching score. The data file builder 170 receives the set of UIDs and update (850) the corresponding data files so that those UIDs among the set of UIDs that are not already in the segment are added to the segment.

In certain embodiments, as shown in FIG. 9B, which illustrates the query weight calculations for a portion of the search index, for each term in the index universe, the following ratios are determined:

$$\text{Ratio1} = (\text{Number of UIDs in input UIDs with the Term/Total Number of UIDs in input UIDs})$$

$$\text{Ratio2} = \text{Number of UIDs in input UIDs with the Term/Number of UIDs in an associated segment}$$

In certain embodiment, the query is weighted using just ratio1, and this is equivalent to the standard use of tf-idf approach. In another embodiment, (ratio1*ratio2) is used as query weights for each term, and submitted to the Search Index. This approach gives higher weight to term frequencies and further promotes terms that are covered more within the custom UIDs.

Figure 8B:
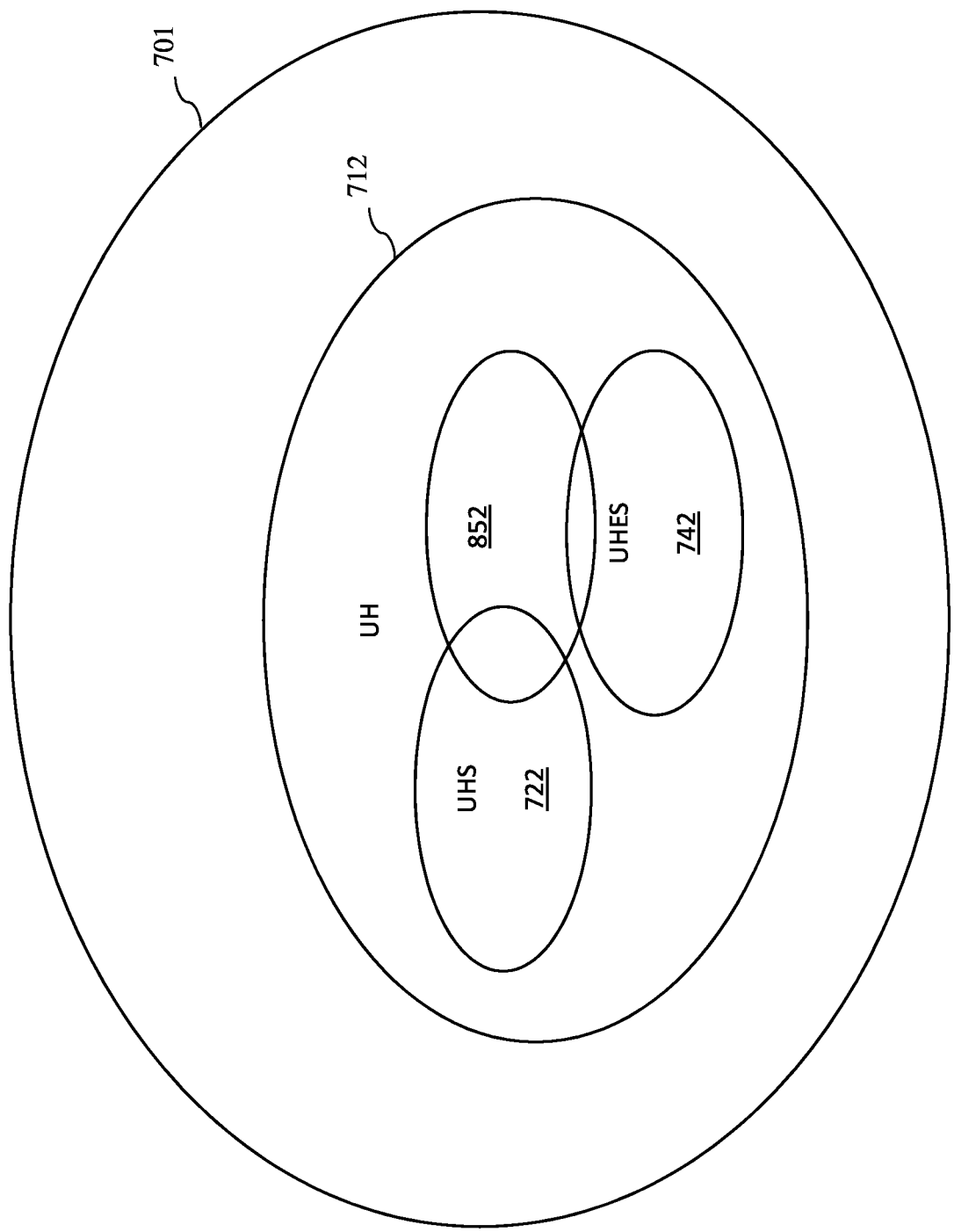
FIG. 8B is a diagram illustrating different subsets of data files according to certain embodiments.

Once the query weights are generated using one of the above methods, a subset of the terms are selected to form the query. These weights are normalized linearly to add up to 100, and highest weighted terms adding up to a top percentage, e.g., 95%, will be selected, which are shown in Table VI in the rows above the triple line and in FIG. 8B as the circle 852.

TABLE VI

| Query Terms | #UIDs in input and Segment | #UIDs in input - total | #UIDs in Segment | Normalized Query Weights | Cumulative Normalized Weights |
|---|---|---|---|---|---|
| p21+ | 17272384 | 123264003 | 145665266 | 21.072 | 21.072 |
| male | 7098752 | 123264003 | 57277357 | 8.660 | 29.732 |
| vda | 7572109 | 123264003 | 70895547 | 9.238 | 38.970 |
| millennials | 5798716 | 123264003 | 55452722 | 7.074 | 46.044 |
| s | 3788350 | 123264003 | 40499748 | 4.622 | 50.665 |

TABLE VI-continued

| Query Terms | #UIDs in input and Segment | #UIDs in input - total | #UIDs in Segment | Normalized Query Weights | Cumulative Normalized Weights |
|---|---|---|---|---|---|
| smb | 2965712 | 123264003 | 27646813 | 3.618 | 54.284 |
| gz | 2903556 | 123264003 | 26760344 | 3.542 | 57.826 |
| female | 2389303 | 123264003 | 18370762 | 2.915 | 60.741 |
| agebracket_20 | 2628177 | 123264003 | 24445972 | 3.206 | 63.947 |
| agebracket_10 | 1570989 | 123264003 | 12872921 | 1.917 | 65.863 |
| gs | 1580637 | 123264003 | 14529895 | 1.928 | 67.792 |
| agebracket_30 | 961051 | 123264003 | 9441848 | 1.172 | 68.964 |
| b_Walmart Supercenter | 762498 | 123264003 | 6212502 | 0.930 | 69.894 |
| b_Subway | 719338 | 123264003 | 5547528 | 0.878 | 70.772 |
| b_McDonald's | 731186 | 123264003 | 5839972 | 0.892 | 71.664 |
| diy | 820247 | 123264003 | 7886487 | 1.001 | 72.665 |
| car | 782650 | 123264003 | 7241932 | 0.955 | 73.619 |
| ed | 816553 | 123264003 | 7994164 | 0.996 | 74.616 |
| hispanics | 813001 | 123264003 | 8112809 | 0.992 | 75.607 |
| soccermoms | 629104 | 123264003 | 5423820 | 0.767 | 76.375 |
| b_Walgreens | 587719 | 123264003 | 4736850 | 0.717 | 77.092 |
| pr | 777078 | 123264003 | 9016720 | 0.948 | 78.040 |
| lnd | 621459 | 123264003 | 5880544 | 0.758 | 78.798 |
| b_Starbucks | 471349 | 123264003 | 3384883 | 0.575 | 79.373 |
| ee | 649883 | 123264003 | 6710363 | 0.793 | 80.166 |
| ml | 707507 | 123264003 | 8156620 | 0.863 | 81.029 |
| lt | 493237 | 123264003 | 4146619 | 0.602 | 81.631 |
| ld | 728534 | 123264003 | 9129452 | 0.889 | 82.520 |
| d | 455084 | 123264003 | 3622703 | 0.555 | 83.075 |
| frequenttravelers | 439416 | 123264003 | 3665630 | 0.536 | 83.611 |
| b_Petsmart | 398443 | 123264003 | 3070749 | 0.486 | 84.097 |
| qd | 411741 | 123264003 | 3376236 | 0.502 | 84.599 |
| cr | 391147 | 123264003 | 3142302 | 0.477 | 85.076 |
| bbs | 364707 | 123264003 | 2775968 | 0.445 | 85.521 |
| b_GNC | 370953 | 123264003 | 2937679 | 0.453 | 85.974 |
| b_UPS | 355140 | 123264003 | 2733995 | 0.433 | 86.407 |
| b_IHOP | 340740 | 123264003 | 2755191 | 0.416 | 86.823 |
| sportsenthusiasts | 369912 | 123264003 | 3248040 | 0.451 | 87.274 |
| b_Cvs | 352434 | 123264003 | 3106264 | 0.430 | 87.704 |
| b_Wendy's | 296892 | 123264003 | 2251996 | 0.362 | 88.066 |
| b_Target | 279263 | 123264003 | 2078280 | 0.341 | 88.407 |
| hhhi | 246169 | 123264003 | 1700446 | 0.300 | 88.707 |
| b_Taco Bell | 246008 | 123264003 | 1766831 | 0.300 | 89.007 |
| agebracket_40 | 372580 | 123264003 | 4057035 | 0.455 | 89.462 |
| b_H&R Block | 270659 | 123264003 | 2215747 | 0.330 | 89.792 |
| b_Burger King | 253628 | 123264003 | 1991607 | 0.309 | 90.102 |
| go | 222728 | 123264003 | 1572662 | 0.272 | 90.373 |
| b_Five Guys Burgers & Fries | 236986 | 123264003 | 1805301 | 0.289 | 90.662 |
| b_Home Depot | 258691 | 123264003 | 2169693 | 0.316 | 90.978 |
| b_Shell | 252561 | 123264003 | 2124380 | 0.308 | 91.286 |
| b_Verizon Wireless | 202468 | 123264003 | 1462145 | 0.247 | 91.533 |
| b_American Airlines | 200478 | 123264003 | 1479373 | 0.245 | 91.778 |
| b_Dollar Tree | 219330 | 123264003 | 1793700 | 0.268 | 92.045 |
| b_Dunkin' Donuts | 239916 | 123264003 | 2152975 | 0.293 | 92.338 |
| b_State Farm | 183447 | 123264003 | 1294616 | 0.224 | 92.562 |
| b_Lowe's | 193881 | 123264003 | 1448205 | 0.237 | 92.798 |
| b_Chick-fil-a | 168323 | 123264003 | 1168103 | 0.205 | 93.004 |
| dis | 259827 | 123264003 | 2939748 | 0.317 | 93.321 |
| b_Little Caesars | 187753 | 123264003 | 1564599 | 0.229 | 93.550 |
| b_Kroger | 146697 | 123264003 | 1027671 | 0.179 | 93.729 |
| bt | 141369 | 123264003 | 966107 | 0.172 | 93.901 |
| b_Wells Fargo | 177824 | 123264003 | 1532588 | 0.217 | 94.118 |
| b_Dollar General | 175149 | 123264003 | 1493944 | 0.214 | 94.332 |
| lc | 191258 | 123264003 | 1784102 | 0.233 | 94.565 |
| gy | 245523 | 123264003 | 2968034 | 0.300 | 94.865 |
| b_7 Eleven | 206852 | 123264003 | 2108127 | 0.252 | 95.117 |
| b_Allstate | 147430 | 123264003 | 1118025 | 0.180 | 95.297 |
| b_Chase | 159251 | 123264003 | 1341513 | 0.194 | 95.491 |
| b_Sonic Drive-In | 140988 | 123264003 | 1052030 | 0.172 | 95.663 |

TABLE VI-continued

| Query Terms | #UIDs in input and Segment | #UIDs in input - total | #UIDs in Segment | Normalized Query Weights | Cumulative Normalized Weights |
|---|---|---|---|---|---|
| b__Bank of America | 169687 | 123264003 | 1553421 | 0.207 | 95.870 |
| b__BP | 139283 | 123264003 | 1066857 | 0.170 | 96.040 |
| b__Ace Hardware | 127726 | 123264003 | 903046 | 0.156 | 96.196 |
| cl | 148765 | 123264003 | 1230545 | 0.181 | 96.377 |
| b__Supercuts | 130819 | 123264003 | 970856 | 0.160 | 96.537 |
| cs | 225151 | 123264003 | 2935199 | 0.275 | 96.812 |
| b__Sbarro | 136910 | 123264003 | 1107685 | 0.167 | 96.979 |
| fe | 209078 | 123264003 | 2664787 | 0.255 | 97.234 |
| b__Jeep | 120367 | 123264003 | 899467 | 0.147 | 97.381 |
| mg | 168097 | 123264003 | 1791497 | 0.205 | 97.586 |
| b__Dominos | 124935 | 123264003 | 991120 | 0.152 | 97.738 |
| b__Family Dollar | 157850 | 123264003 | 1630337 | 0.193 | 97.931 |
| b__Papa John's | 119367 | 123264003 | 950041 | 0.146 | 98.076 |
| ds | 104975 | 123264003 | 765714 | 0.128 | 98.204 |
| b__PNC Bank | 108137 | 123264003 | 833070 | 0.132 | 98.336 |
| b__Publix | 114171 | 123264003 | 967692 | 0.139 | 98.476 |
| b__Circle K | 93593 | 123264003 | 716905 | 0.114 | 98.590 |
| ic | 131991 | 123264003 | 1462471 | 0.161 | 98.751 |
| b__Publix Pharmacy | 92776 | 123264003 | 749992 | 0.113 | 98.864 |
| md | 131069 | 123264003 | 1893877 | 0.160 | 99.024 |
| fcd | 54095 | 123264003 | 347920 | 0.066 | 99.090 |
| pa | 77120 | 123264003 | 784920 | 0.094 | 99.184 |
| iab | 84835 | 123264003 | 955179 | 0.103 | 99.287 |
| pel | 54101 | 123264003 | 426714 | 0.066 | 99.353 |
| pl | 57264 | 123264003 | 533264 | 0.070 | 99.423 |
| it | 136092 | 123264003 | 3089217 | 0.166 | 99.589 |
| if | 87240 | 123264003 | 1277955 | 0.106 | 99.696 |
| sdd | 39738 | 123264003 | 281059 | 0.048 | 99.744 |
| b__Captivate | 48934 | 123264003 | 463933 | 0.060 | 99.804 |
| chs | 37790 | 123264003 | 332429 | 0.046 | 99.850 |
| lh | 21477 | 123264003 | 135247 | 0.026 | 99.876 |
| ele | 29334 | 123264003 | 266878 | 0.036 | 99.912 |
| ls | 13084 | 123264003 | 112132 | 0.016 | 99.928 |
| ilab | 8405 | 123264003 | 80453 | 0.010 | 99.938 |
| fs | 26755 | 123264003 | 991091 | 0.033 | 99.971 |
| lds | 4479 | 123264003 | 36814 | 0.005 | 99.976 |
| ffs | 8505 | 123264003 | 142975 | 0.010 | 99.987 |
| lr | 2214 | 123264003 | 14713 | 0.003 | 99.989 |
| com | 8734 | 123264003 | 724032 | 0.011 | 100.000 |

In certain embodiments, each, some or all of the components in the system 150 and their respective sub-components can be provided by one computer/server 120 or multiple computers/servers 120 coupled to each other via local and/or wide area networks. Also, the different in the system 150 and their respective sub-components can be provided by different computer/server systems 120 coupled to each other via local and/or wide area networks.

Figure 10:
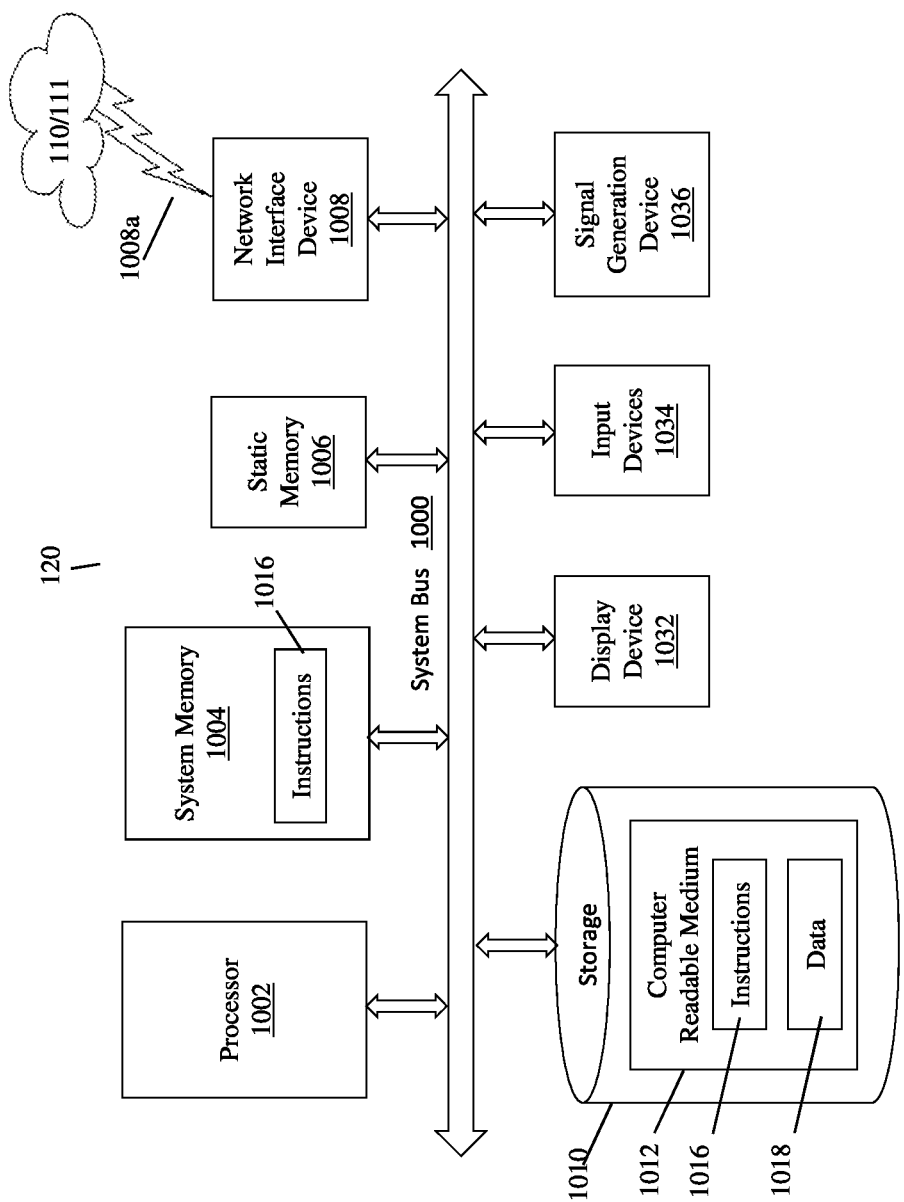
FIG. 10 is a diagrammatic representation of a computer/server that performs one or more of the methodologies and/or to provide one or more of the systems or their components described herein according to embodiments.

FIG. 10 illustrates a diagrammatic representation of an exemplary computer/server 120 that can be used to provide any one or more components in the system 150 by executing proprietary software instructions. The computer/server 120 may operate as a standalone device or as a peer computing device in a peer-to-peer (or distributed) network computing environment. As shown in FIG. 10, the computer/server 120 includes one or more processors 1002 (e.g., a central processing unit (CPU), a graphic processing unit (GPU), and/or a digital signal processor (DSP)) and a system or main memory 1004 coupled to each other via a system bus 1000. The computer/server 120 may further include static memory 1006, a network interface device 1008, a storage unit 1010, one or more display devices 1030, one or more input devices 1034, and a signal generation device (e.g., a speaker) 1036, with which the processor(s) 1002 can communicate via the system bus 1000.

In certain embodiments, the display device(s) 1030 include one or more graphics display units (e.g., a plasma display panel (PDP), a liquid crystal display (LCD), a projector, or a cathode ray tube (CRT)). The input device(s) 1034 may include an alphanumeric input device (e.g., a keyboard), a cursor control device (e.g., a mouse, trackball, joystick, motion sensor, or other pointing instrument). The storage unit 1010 includes a machine-readable medium 1012 on which is stored instructions 1016 (e.g., software) that enable anyone or more of the systems, components, methodologies or functions described herein. The storage unit 1010 may also store data 1018 used and/or generated by the systems, components, methodologies or functions, including data in any, part, some, or all of the POI data 151, the map data 152, the spatial index database 158, the request log 168, the impression log 164, click/call log 166, the data filed 171, the segment database 174, the search index 925, etc. The instructions 1016 (e.g., software) may be loaded, completely or partially, within the main memory 1004 or within the processor 1002 (e.g., within a processor's cache memory) during execution thereof by the computer/server 120. Thus, the main memory 1004 and the processor 1102 also constituting machine-readable media.

While machine-readable medium 1012 is shown in an example implementation to be a single medium, the term "machine-readable medium" should be taken to include a single medium or multiple media (e.g., a centralized or distributed database, or associated caches and servers) able to store instructions (e.g., instructions 1124). The term "machine-readable medium" shall also be taken to include any medium that is capable of storing instructions (e.g., instructions 1016) for execution by the computer/server 120 and that cause the computing device 1100 to perform anyone or more of the methodologies disclosed herein. The term "machine-readable medium" includes, but not be limited to, data repositories in the form of solid-state memories, optical media, and magnetic media. In certain embodiments, the instructions 1016 and/or data 1018 can be stored in the network 100 and accessed by the computer/server 120 via its network interface device 1008, which provides wired and/or wireless connections to a network, such as a local area network 111 and/or a wide area network (e.g., the Internet 110) via some type of network connectors 1080a. The instructions 1016 (e.g., software) and or data 1018 may be transmitted or received via the network interface device 208.

With the behavioral audience segments built, incoming requests can be processed by the information server using the segments. In certain embodiments, for each incoming request, the information server process 154 determines one or more eligible segments to which the UID in the request belongs, ranks the eligible segments based on the associated segment types, and the location information in the request, and selects the information associated with the top-ranked segment for delivering to the mobile device associated with the UID.

We claim:

1. A method for segmenting mobile entities, comprising:
at one or more computer systems coupled to a packet-based network and including or having access to electronic storage media storing therein events associated with mobile entities communicating with the packet-based network using signals, each of the events having one or more features;
determining, for a mobile segment, a plurality of feature gains corresponding, respectively, to a plurality of features related to the mobile segment, wherein a respective feature gain corresponding to a respective feature is related to a respective first probability of finding the respective feature in any of a set of events associated with mobile entities in a first set of mobile entities and a respective second probability of finding the respective feature in any of a set of events associated with mobile entities in a second set of mobile entities;
assigning weights to the plurality of features, wherein the plurality of features include location features corresponding to geo-fences, the location features including one or more first location features each corresponding to at least one geo-fence of a first type, and one or more second location features each corresponding to at least one geo-fence of a second type, and wherein each of the one or more first location features is assigned a weight that is greater than a weight assigned to any of the one or more second location features; and
ranking a plurality of mobile entities to determine a set of mobile entities for the mobile segment, including determining a respective relevance measure for a respective mobile entity based on a plurality of factors, the plurality of factors including the plurality of feature gains, the weights assigned to the plurality of features, and for each particular feature of the plurality of features, frequency of events associated with the respective mobile entity and having the particular feature.

2. The method of claim 1, wherein the plurality of features include features selected for the mobile segment and additional features, and wherein each of the features selected for the mobile segment is assigned a weight that is greater than a weight assigned to any of the additional features.

3. The method of claim 2, wherein the features selected for the mobile segment include predefined features and extended features, and wherein the extended features are determined from events associated with mobile entities satisfying predetermined constraints based on the predefined features.

4. The method of claim 1, wherein determining a plurality of feature gains corresponding, respectively, to a plurality of features related to the mobile segment comprises:
determining a core set of mobile entities as the first set of mobile entities and a potential set of mobile entities as the second set of mobile entities based at least on first and second predefined constraints, each mobile entity in the core set of mobile entities satisfying the first and second constraints, each mobile entity in the potential set of mobile entities satisfying one of the first constraint and the second constraint.

5. The method of claim 1, wherein the location features include brand names associated with points of interest (POI's).

6. The method of claim 1, wherein each of the at least one geo-fence of the first type has a polygonal shape outlining a building or a premise of a point of interest (POI), and wherein each of the at least one geo-fence of the second type has a circular shape with a predefined radius.

7. The method of claim 1, wherein the plurality of features further include one or more non-location features, and wherein the weight assigned to any of the one or more second location features is greater than a weight assigned to any of the one or more non-location features.

8. The method of claim 7, wherein the one or more non-location features include at least one feature related to an application operable on mobile devices.

9. The method of claim 1, wherein the respective relevance measure includes a weighted sum of a plurality of terms corresponding, respectively, to at least some of the plurality of features, each specific term of the plurality of terms being related to a feature gain of the specific feature and frequency of events associated with the respective mobile entity and having the specific feature, the specific feature being weighted by a weight assigned to the specific feature.

10. The method of claim 1, wherein the plurality of events further include feedback events, and the plurality of factors further include one or more measures corresponding to one or more types of feedback events associated with the respective mobile entity, the one or more types of feedback events include one or more of a type of feedback events associated with impressions of certain information on mobile devices, a type of feedback events associated with clicks on certain links displayed on mobile devices, a type of feedback events associated with calls to certain phone numbers made with mobile devices, and a type of feedback events associated with secondary actions carried out using mobile devices.

11. A method for segmenting mobile entities, comprising:
at one or more computer systems coupled to a packet-based network and including or having access to electronic storage media storing therein events associated with mobile entities communicating with the packet-based network, each of the events having one or more features;

for each mobile entity of a plurality of mobile entities, determining whether the mobile entity satisfies any of a plurality of preset constraints based on a set of events associated with the mobile entity;

determining a core set of mobile entities and a potential set of mobile entities, each mobile entity in the core set of mobile entities satisfying the plurality of constraints, each mobile entity in the potential set of mobile entities satisfying at least one but not all of the plurality of constraints;

determining, for a mobile segment, a plurality of feature gains corresponding, respectively, to a plurality of features related to the mobile segment, wherein a respective feature gain corresponding to a respective feature is related to a first probability of finding the respective feature in any of a first set of events and a second probability of finding the respective feature in any of a second set of events, each of the first set of events being associated with one of the core set of mobile entities, each of the second set of events being associated with one of the potential set of mobile entities;

assigning weights to the plurality of features, wherein the plurality of features include features of a plurality of types, the plurality of types including a first type and a second type, and wherein each feature of the first type is assigned a weight that is greater than a weight assigned to any feature of the second type; and ranking a plurality of mobile entities to determine a set of mobile entities for the mobile segment, including determining a respective relevance measure for a respective mobile entity based on a plurality of factors, the plurality of factors including the plurality of feature gains, the weights assigned to the plurality of features, and for each particular feature of the plurality of features, frequency of events associated with the respective mobile entity and having the particular feature.

12. The method of claim 11, wherein the features of the first type are location features and the features of the second type are non-location features, each of the location features corresponding to a preset geo-fence, each of the non-location features being independent of any preset geo-fences.

13. The method of claim 11, wherein the features of the first type correspond to geo-fences of a first type, and the features of the second type correspond to geo-fences of a second type.

14. The method of claim 13, wherein each of the geo-fences of the first type has a polygonal shape outlining a building or a premise of a point of interest (POI), and wherein each of the geo-fences of the second type has a circular shape with a predefined radius.

15. The method of claim 11, wherein the plurality of features include features selected for the mobile segment and additional features, and wherein the features of the first type correspond to the features selected for the mobile segment and the features of the second type correspond to the additional features.

16. The method of claim 11, wherein the plurality of factors further include one or more measures corresponding to one or more types of feedback events associated with the respective mobile entity, the one or more types of feedback events include one or more of a type of feedback events associated with impressions of certain information on mobile devices, a type of feedback events associated with clicks on certain links displayed on mobile devices, a type of feedback events associated with calls to certain phone numbers made with mobile devices, and a type of feedback events associated with secondary actions carried out using mobile devices.

17. A system for segmenting mobile entities, comprising:

electronic storage media storing therein events of mobile entities communicating with the packet-based network, each of the events having one or more features;

one or more processors in one or more computer systems coupled to a packet-based network and including or having access to the electronic storage;

memory coupled to the one or more processors and storing therein program instructions, which, when executed by the one or more processors, cause the one or more processors to carry out a method, comprising:

for each mobile entity of a plurality of mobile entities, determining whether the each mobile entity satisfies any of a plurality of preset constraints based on a set of events associated with the mobile entity;

determining a core set of mobile entities and a potential set of mobile entities, each mobile entity in the core set of mobile entities satisfying the plurality of constraints, each mobile entity in the potential set of mobile entities satisfying at least one but not all of the plurality of constraints;

determining, for a mobile segment, a plurality of feature gains corresponding, respectively, to a plurality of features related to the mobile segment, wherein a respective feature gain corresponding to a respective feature is related to a probability of finding the respective feature in any of a first set of events and a probability of finding the respective feature in any of a second set of events, each of the first set of events being associated with one of the core set of mobile entities, each of the second set of events being associated with one of the potential set of mobile entities;

assigning weights to the plurality of features, wherein the plurality of features include features of a plurality of types, the plurality of types including a first type and a second type, and wherein each feature of the first type is assigned a weight that is greater than a weight assigned to any feature of the second type; and ranking a plurality of mobile entities to determine a set of mobile entities for the mobile segment, including determining a respective relevance measure for a respective mobile entity based on a plurality of factors, the plurality of factors including the plurality of feature gains, the weights assigned to the plurality of features, and for each particular feature of the plurality of features, frequency of events associated with the respective mobile entity and having the particular feature.

18. The system of claim 17, wherein the features of the first type location features and the features of the second type are non-location features, each of the location features corresponding to a preset geo-fence, each of the non-location features being independent of any of preset geo-fences.

19. The system of claim 17, wherein the features of the first type correspond geo-fences of a first type, and the features of the second type correspond to geo-fences of a second type.

20. The system of claim 17, wherein the plurality of features include features selected for the mobile segment and additional features, and wherein the features of the first type correspond to the features selected for the mobile segment and the features of the second type correspond to the additional features.

\* \* \* \* \*